US008538105B2

(12) United States Patent
Masumoto

(10) Patent No.: US 8,538,105 B2
(45) Date of Patent: Sep. 17, 2013

(54) MEDICAL IMAGE PROCESSING APPARATUS, METHOD, AND PROGRAM

(75) Inventor: Jun Masumoto, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 126 days.

(21) Appl. No.: 13/275,810

(22) Filed: Oct. 18, 2011

(65) Prior Publication Data
US 2012/0093388 A1 Apr. 19, 2012

(30) Foreign Application Priority Data
Oct. 18, 2010 (JP) .................. 2010-233416

(51) Int. Cl.
G06K 9/00 (2006.01)
A61B 5/05 (2006.01)
A61B 6/00 (2006.01)

(52) U.S. Cl.
USPC ............. 382/128; 378/4; 600/410; 600/425

(58) Field of Classification Search
USPC .............. 382/128, 129, 130, 131, 132, 133, 382/134; 378/4, 8, 21–27, 101, 901; 600/407, 600/408, 410, 411, 425, 427; 128/920, 922
See application file for complete search history.

(56) References Cited
U.S. PATENT DOCUMENTS
6,252,599 B1 6/2001 Natsuko et al.
8,311,307 B2 * 11/2012 Kitamura .................. 382/131

2004/0249270 A1 * 12/2004 Kondo et al. ............ 600/425
2010/0076296 A1 * 3/2010 Mittal et al. ............ 600/408
2010/0215225 A1 8/2010 Kadomura et al.
2011/0018871 A1 1/2011 Shirahata FOREIGN PATENT DOCUMENTS
| JP | H1156832 A | 3/1999 |
| JP | 2006167287 A | 6/2006 |
| JP | 2009-195561 A | 9/2009 |
| WO | 2006118100 A1 | 11/2006 |
| WO | 2009116465 A1 | 9/2009 |

OTHER PUBLICATIONS
European Search Reporting, Application No. 11185546.6-2218; Feb. 8, 2012.
Three-dimensional multi-scale line filter for segmentation and visualization of curvilinear structures in medical images; Yoshinobu Sato, et al.; Medical Image Analysis, Jun. 1998, vol. 2, No. 2, pp. 143-168.
Japanese Office Action 2010-233416; Apr. 9, 2013.

* cited by examiner

*Primary Examiner* — Abolfazl Tabatabai
(74) *Attorney, Agent, or Firm* — Sughrue Mion, PLLC

(57) ABSTRACT

A medical image processing apparatus in which an index value calculation unit calculates an index value representing a characteristic of a tubular structure extracted from a three-dimensional medical image in each direction of radial visual lines orthogonal to a core line of the tubular structure at each of a plurality of points on the core line with each point as each viewpoint and a map image generation unit generates a characteristic map image representing the characteristic inside of the tubular structure by mapping the index value calculated in each direction of the radial visual lines at each point on the core line to a coordinate plane defined by a first coordinate component representing a position in a direction of the core line and a second coordinate component representing a direction of each visual line.

20 Claims, 19 Drawing Sheets

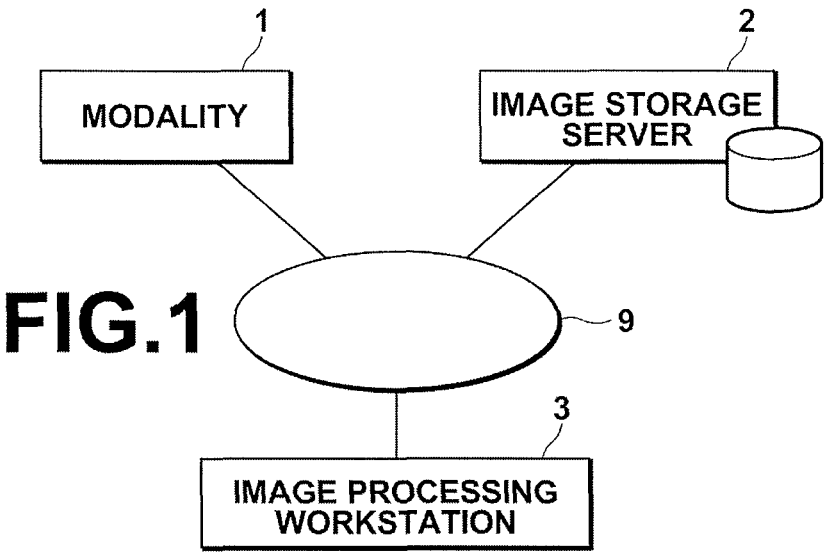
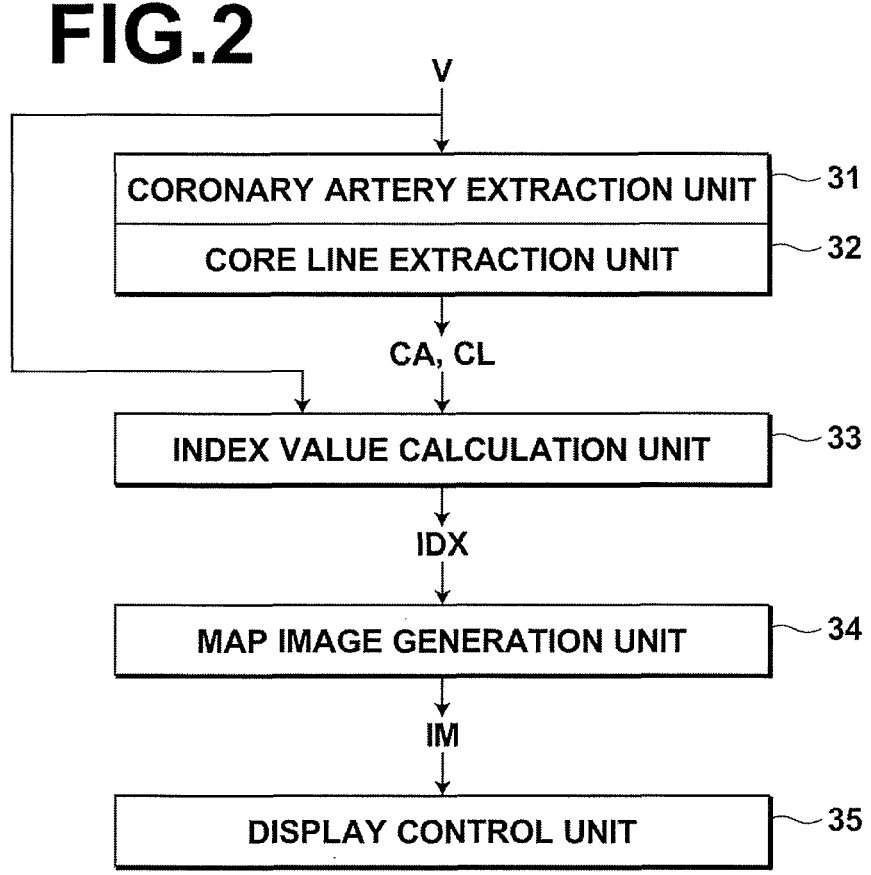

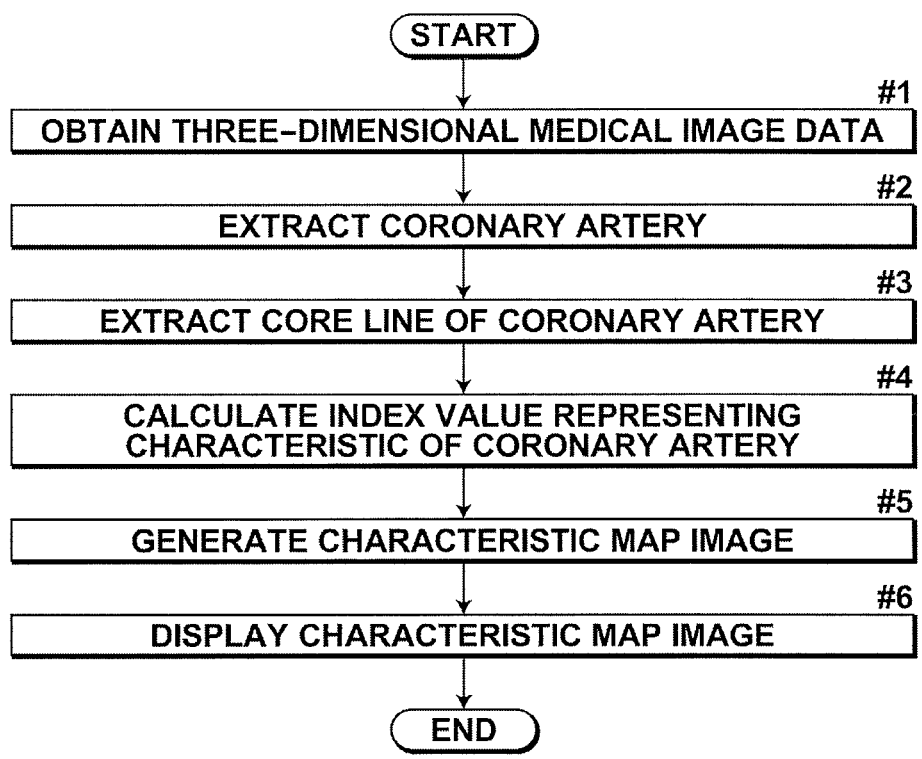

FIG.6A
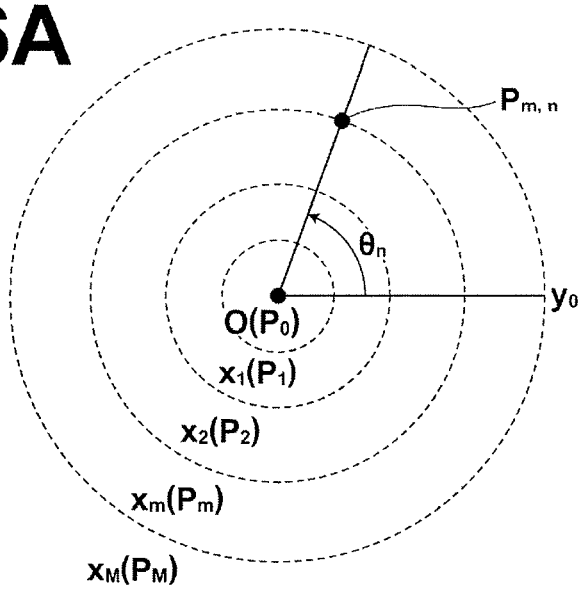
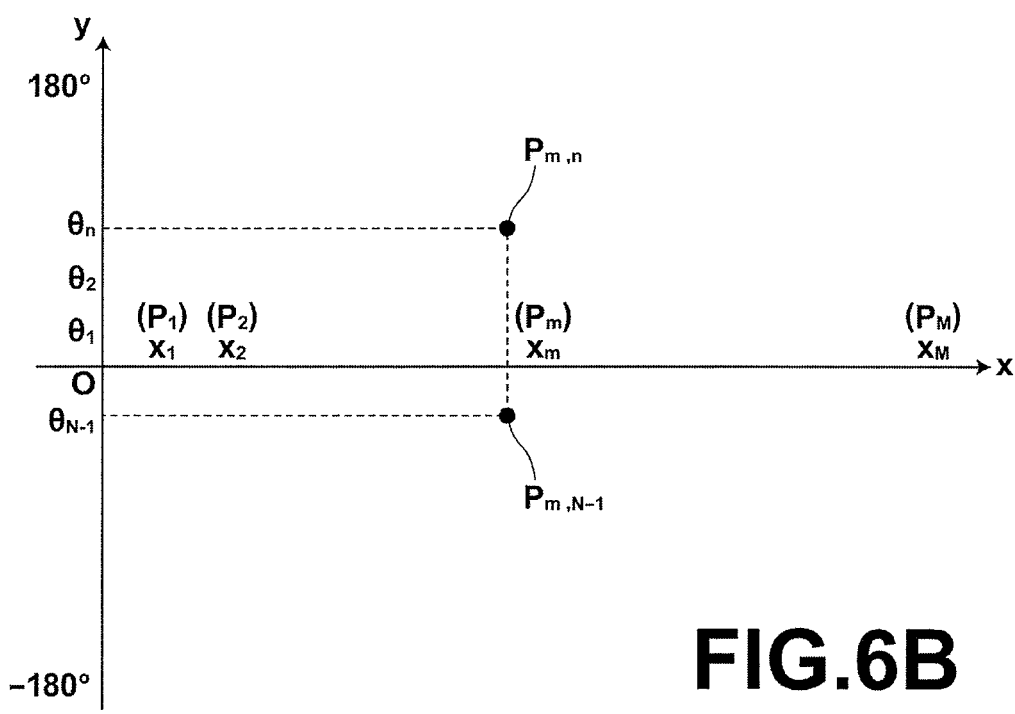
FIG.6B

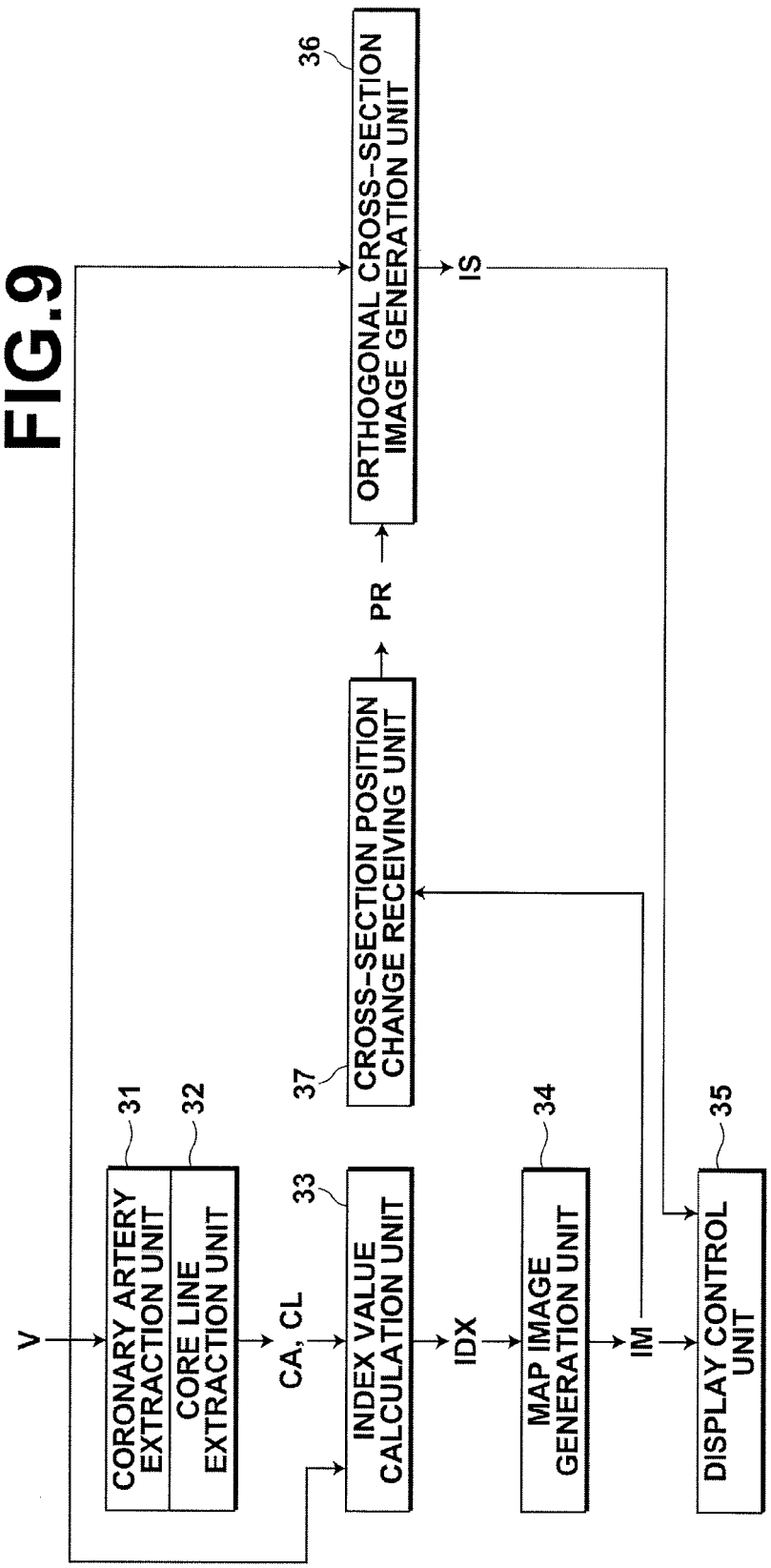

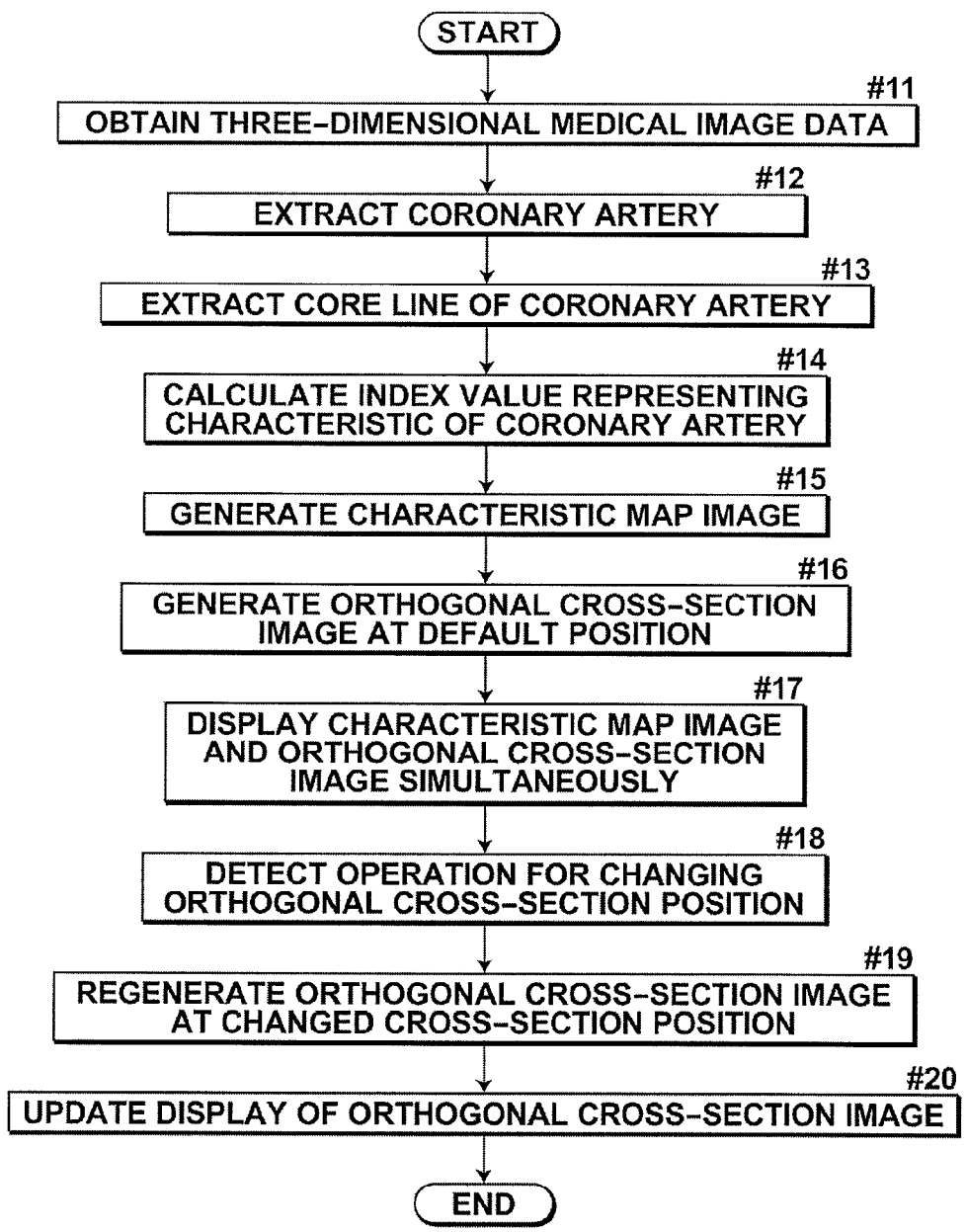

POSITIONAL RELATIONSHIP SETTING
BETWEEN MAP IMAGING RANGE AND
ORTHOGONAL CROSS-SECTION

- ⦿ EVEN DISPLAY OF CHARACTERISTIC MAP BEFORE AND AFTER ORTHOGONAL CROSS-SECTION

- ○ PRIORITY DISPLAY OF CHARACTERISTIC MAP IN FRONT SIDE OF CROSS-SECTION

- ○ PRIORITY DISPLAY OF CHARACTERISTIC MAP IN BACK SIDE OF CROSS-SECTION

MEDICAL IMAGE PROCESSING APPARATUS, METHOD, AND PROGRAM

BACKGROUND OF THE INVENTION

1. Field of the Invention

The present invention relates to a medical image processing technology for representing a characteristic of a tubular structure in a three-dimensional medical image.

2. Description of the Related Art

Medical image analysis techniques have been advancing rapidly with a wide spread use of multi-detector row computed tomography in clinical practice. For example, in the field of cardiac medicine, it has become possible to image the entire heart in a shorter period of time and obtain an image without substantially any artifact due to cardiac motion. Consequently, in the image diagnosis of cardiac region, more detailed diagnosis of a stenosis portion of a coronary artery has become possible. In the field of coronary artery observation, a method for specifying a center line of an observation target coronary artery and examining orthogonal cross-sections orthogonal to the center line along the center line and a method for examining an image representing a cross-section along the center line of the blood vessel using a CPR (Curved Planar Reformation) technique as described, for example, in Japanese Unexamined Patent Publication No. 2009-195561 are generally known. Here, the doctor examines as to what type of stenosis is present at which position of the blood vessel. Blood vessel can be clogged by a hard plaque in which the blood vessel is clogged by a completely calcified area or by a soft plaque in which the blood vessel is clogged by a soft tissue, such as fat. In CT images, the former can be discriminated as having a signal higher than the CT value of a normal blood vessel lumen and the latter can be discriminated as having a signal lower than the CT value of a normal blood vessel lumen.

When a specific plaque is discovered as a result of such blood vessel observation, the doctor needs to observe a three-dimensional plaque distribution adjacent to the plaque. In such a case, if an orthogonal cross-section image of the blood vessel is the observation target, it is necessary to perform observation by moving the position of orthogonal cross-section back and forth along the center line of the blood vessel. In the mean time, if a CPR image of the blood vessel is the observation target, it is necessary to perform observation by rotating the cross-section with the center line as the rotational axis.

That is, in the orthogonal cross-section image of the blood vessel, it is possible to know the plaque distribution and state of stenosis in all circumferential directions of the blood vessel at the position of the orthogonal cross-section, but it is difficult to observe how the plaque presents in the depth direction along the center line of the blood vessel and how the blood vessel is narrowed. In the CPR image of the blood vessel, it is possible to know the plaque distribution and state of stenosis in the depth direction along the center line of the blood vessel, but these are the states in a particular cross-section along the center line of the blood vessel and it is impossible to observe how the plaque is distributed and how the blood vessel is narrowed over the entire circumference of the blood vessel.

The present invention has been developed in view of the circumstances described above, and it is an object of the present invention to provide a medical image processing apparatus, method and program capable of obviously visualizing a characteristic of a tubular structure in a three-dimensional image.

SUMMARY OF THE INVENTION

A medical image processing apparatus of the present invention is an apparatus, including:

a tubular structure extraction unit for extracting a tubular structure from a three-dimensional medical image representing the tubular structure;

a core line extraction unit for extracting a core line of the extracted tubular structure;

an index value calculation unit for calculating an index value representing a characteristic of the tubular structure in each direction of radial visual lines orthogonal to the extracted core line at each of a plurality of points on the core line with each point as each viewpoint; and a characteristic map image generation unit for generating a characteristic map image representing the characteristic inside of the tubular structure by mapping the index value calculated in each direction of the radial visual lines at each point on the core line to a coordinate plane defined by a first coordinate component representing a position in a direction of the core line and a second coordinate component representing a direction of each visual line.

A medical image processing method of the present invention is a computer-implemented method, including the steps of:

extracting a tubular structure from a three-dimensional medical image representing the tubular structure;

extracting a core line of the extracted tubular structure;

calculating an index value representing a characteristic of the tubular structure in each direction of radial visual lines orthogonal to the core line at each of a plurality of points on the extracted core line with each point as each viewpoint; and generating a characteristic map image representing the characteristic inside of the tubular structure by mapping the index value calculated in each direction of the radial visual lines at each point on the core line to a coordinate plane defined by a first coordinate component representing a position in a direction of the core line and a second coordinate component representing a direction of each visual line.

A medical image processing program of the present invention is a program for causing a computer to function as each unit of the medical image processing apparatus described above.

A specific example of the tubular structure may be a blood vessel, such as a coronary artery or the like.

A specific example of the index value representing a characteristic of the tubular structure may be a stenosis rate of the tubular structure or an index value representing a characteristic of a plaque inside of the tubular structure.

Further, an index value representing a characteristic of the tubular structure over the entire target region for generating the characteristic map image may also be calculated in addition to the index value in each visual line direction. For example, an average stenosis rate of the tubular structure or a volume of plaque over the entire target region for generating the characteristic map image may be calculated.

Further, when calculating the index value, two types of index values may be calculated. In this case, a characteristic map image in which either one of the two types of index values is represented in a coordinate space defined by the first and second coordinate components, and a third coordinate component representing the either one of the two types of index values as a coordinate value of the third coordinate component, while the other of the two types of index values is represented by at least one of color, density, and pattern may be generated.

The coordinate plane for generating the characteristic map image may be a plane represented by a polar coordinate system or a rectangular coordinate system defined by the first coordinate component and the second coordinate component.

In the present invention, another type of image representing the tubular structure may further be generated and the generated image and the characteristic map image may be cooperatively displayed.

More specifically, a first cross-section image of a cross-section that passes through a given reference point on the core line and orthogonal to the core line at the reference point may be generated, and the characteristic image and the first cross-section image may be displayed on a display unit in a manner that allows a position in the characteristic map image corresponding to the reference point of the first cross-section image to be identified.

Further, an arrangement may be adopted in which the position of the reference point is allowed to be changed manually or automatically, then the first cross-section image is regenerated based on the changed reference point, and the display of the characteristic map image and the cross-section image is updated based on the position of the changed reference point and the regenerated first cross-section image.

In the case where the characteristic map image is an image generated based on a polar coordinate system, an arrangement may be adopted in which a second cross-section image of a cross-section that passes through a given reference point on the core line and orthogonal to the core line at the reference point is generated from the three-dimensional medical image such that a direction of a predetermined straight line in the cross-section passing through an intersection point of the cross-section and the core line within the cross-section image corresponds to a direction of a straight line in the characteristic map image corresponding to the predetermined straight line, and the characteristic map image and the second cross-section image are displayed on a display unit.

Further, an arrangement may be adopted in which the characteristic map image is allowed to be rotated manually or automatically by a given angle centered on a point representing the core line in the image, then in response to this, the already generated second cross-section image is regenerated so as to be rotated by the given angle, and the current display is updated to the display of the rotated characteristic map image and second cross-section image.

Contrary to this, an arrangement may be adopted in which the second cross-section image is allowed to be rotated manually or automatically by a given angle centered on a point representing the core line in the image, then in response to this, the already generated characteristic map image is regenerated so as to be rotated by the given angle, and the current display is updated to the display of the rotated characteristic map image and second cross-section image.

Further, an arrangement may be adopted in which a longitudinal direction image of the tubular structure within a predetermined range in a direction of the core line is generated from the three-dimensional medical image, and the longitudinal direction image and the characteristic map image are displayed on a display unit in a manner that allows a range (map imaging range) of the tubular structure in the core line direction represented in the characteristic map image to be identified in the longitudinal direction image. A specific example of the longitudinal direction image of the tubular structure may be a CPR image representing the cross-section along the longitudinal direction of the tubular structure generated by a CPR method. Further, an arrangement may be adopted in which the map imaging range is allowed to be changed in the longitudinal direction image, then the characteristic map image is regenerated based on the changed map imaging range, and the display of the characteristic map image and the longitudinal direction image to be updated based on the changed map imaging range and the regenerated characteristic map image.

Contrary to this, an arrangement may be adopted in which the generated longitudinal direction image and the characteristic map image are displayed on a display unit in a manner that allows a range (longitudinal direction imaging range) of the tubular structure in the core line direction represented in the longitudinal direction image to be identified in the characteristic map image. Further, an arrangement may be adopted in which the longitudinal direction imaging range is allowed to be changed manually or automatically in the characteristic map image, the longitudinal direction image is regenerated based on the changed longitudinal direction imaging range, and the display of the characteristic map image and the longitudinal direction image is updated based on the changed longitudinal direction imaging range and the regenerated longitudinal direction image.

According to the present invention, an index value representing a characteristic of a tubular structure extracted from a three-dimensional medical image may be calculated in each direction of radial visual lines orthogonal to the core line of the tubular structure at each of a plurality of points on the core line with each point as each viewpoint, and a characteristic map image representing the characteristic inside of the tubular structure may be generated by mapping the index value calculated in each direction of the radial visual lines at each point on the core line to a coordinate plane defined by a first coordinate component representing a position in a direction of the core line and a second coordinate component representing a direction of each visual line. This allows obvious visual recognition of the characteristic of the tubular structure in the three-dimensional medical image using the characteristic map image, thereby reducing the time and effort to observe a plurality of images by changing the display range as required in the case in which observation is performed using a convention image (orthogonal cross-section image or CPR image) representing a tubular structure and improving the efficiency of observation. In this way, the present invention may improve efficiency for observing a characteristic of a tubular structure using an image.

In the present invention, in the case where two types of index values are calculated and a characteristic map image in which each type index value is represented in a coordinate space defined by the first and second coordinate components, and a third coordinate component representing either one of the two types of index values is generated, the characteristic of the tubular structure may be observed from various aspects using a plurality of types of index values, thereby contributing to the observation accuracy.

Further, in the present invention, in the case where another type of image (orthogonal cross-section image or longitudinal direction image) representing the tubular structure is further generated and the generated another image and the characteristic map image are displayed cooperatively, a more exhaustive observation may be made by, for example, observing a point of interest observed in either one of the another image representing the tubular structure and the characteristic map image also in the other image.

BRIEF DESCRIPTION OF THE DRAWINGS

FIG. 1 a schematic configuration diagram of a medical image diagnosis system that employs a medical image processing apparatus according to an embodiment of the present invention.

FIG. 2 is a block diagram schematically illustrating a configuration and a processing flow for realizing a medical image processing function in first to third embodiments of the present invention.

FIG. 3 is a flowchart illustrating a medical image processing flow using a medical image diagnosis system according to the first to third embodiments of the present invention.

FIG. 6A is a coordinate plane of a polar coordinate system to which index values are mapped.

FIG. 6B is a coordinate plane of a rectangular coordinate system to which index values are mapped.

FIG. 9 is a block diagram schematically illustrating a configuration and a processing flow for realizing a medical image processing function in a fourth embodiment of the present invention.

FIG. 10 is a flowchart illustrating a medical image processing flow using a medical image diagnosis system according to the fourth embodiment of the present invention.

DESCRIPTION OF THE PREFERRED EMBODIMENTS

Figure 4:
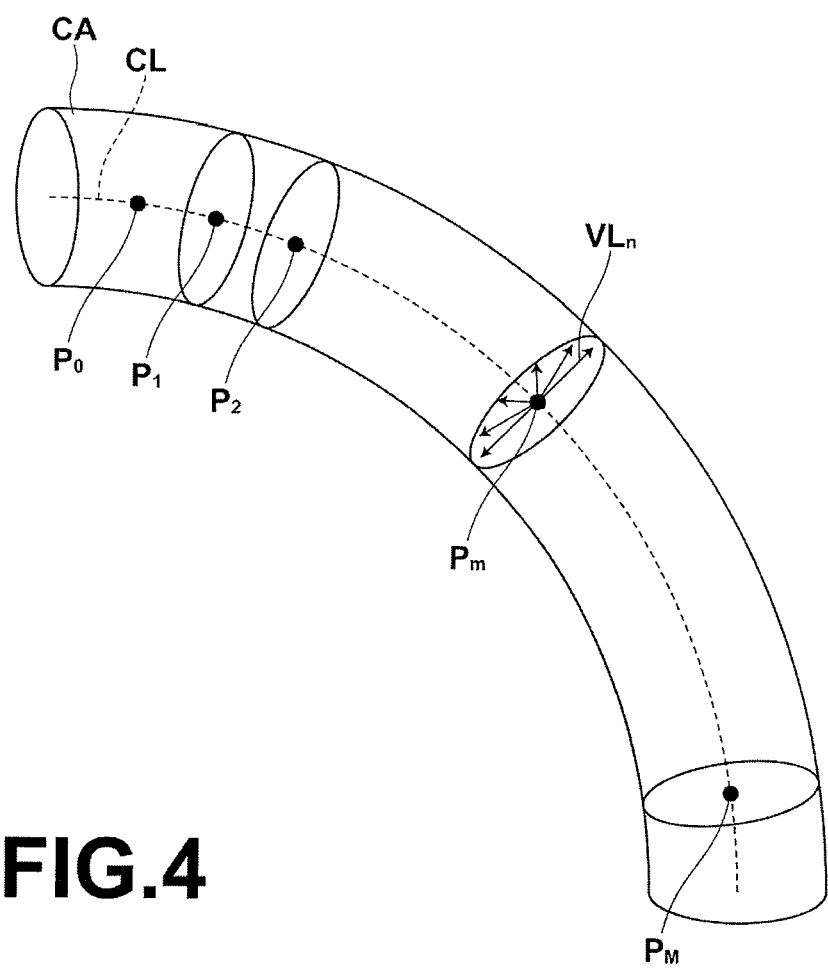
FIG. 4 schematically illustrates a coronary artery, a core line, and visual lines from each point on the core line.

Hereinafter, a medical image diagnosis system that employs a medical image processing apparatus of an embodiment of the present invention will be described, taking, as an example, the case in which a characteristic of a plaque of a human coronary artery is observed.

FIG. 1 is a hardware configuration diagram of the medical image diagnosis system, illustrating an overview thereof. As illustrated in FIG. 1, the system includes modality 1, image storage server 2, and image processing workstation 3 communicatively linked to each other via network 9.

Modality 1 includes a system for imaging an observation target region of a subject to generate image data of a three-dimensional medical image representing the region and outputting the image data by adding auxiliary information defined by DICOM (Digital Imaging and Communications in Medicine) standard as image information. In the present embodiment, modality 1 includes multi-detector-row computed tomography and MRI. Specific examples include a CT system, an MRI system, and the like. In the present embodiment, the description will be made of a case in which three-dimensional image data of a human chest region, which is the subject, are obtained by scanning the human body in the body axis direction with a CT system.

Image storage server 2 is a computer for storing medical image data obtained by modality 1 and image data of a medical image generated through image processing in image processing workstation 3 in an image database, and managing the image data. Image storage server 2 includes a large capacity external storage and database management software (e.g., ORDB (Object Relational Database) management software).

Image processing workstation 3 functions as the medical image processing apparatus of the present invention. Image processing workstation 3 is a computer that performs image processing (including image analysis) on medical image data obtained from modality 1 or image storage server 2 in response to a request from a radiologist and displays a resultant image. It has a known hardware configuration, including CPU, main memory, auxiliary memory, I/O interface, communication interface, input device (mouse, keyboard, and the like), display monitor, data bus, and the like, with a known operating system installed thereon. The medical image processing of the present invention is realized by executing a program installed from a recording medium, such as a CD-ROM or the like. It may be a program downloaded from a storage device of a server linked via a network, such as the Internet, and installed on the workstation.

The image data storage format and communication between each component via network 9 are based on the DICOM protocol or the like.

FIG. 2 is a block diagram of a part of image processing workstation 3 relevant to medical image processing of a first embodiment of the present invention. As illustrated in FIG. 2, the medical image processing of the present embodiment is realized by coronary artery extraction unit 31, core line extraction unit 32, index value calculation unit 33, map image generation unit 34, and display control unit 35. The three-dimensional medical image V, coronary artery information CA, core line information CL, index value $IDX_{m,n}$, and characteristic map image IM are data written into and read out from a predetermined memory area of image processing workstation 3 by each processing unit described above.

Next, processing performed by each unit described above will be described in detail along the flow of the medical image processing of a first embodiment of the present invention. FIG. 3 is a flowchart illustrating a flow of user operation, calculation processing, display processing, and the like under the execution of medical image processing software of the present embodiment.

First, image processing workstation 3 obtains image data of a three-dimensional medical image V (#1). The three-dimensional medical image data V have been obtained by modality 1 and stored in image storage server 2. The three-dimensional medical image data V are extracted through database searching performed by image storage server 2 in response to a database query from image processing workstation 3 and sent to image processing workstation 3.

Coronary artery extraction unit 31 reads the three-dimensional image data V to extract a coronary artery in the three-dimensional medical image V and stores the extracted coronary artery in a predetermined memory area of image processing workstation 3 as coronary artery information CA representing the extraction result (#2). Core line extraction unit 32 reads the coronary artery information CA to extract a core line of the coronary artery and stores the extracted core line in a predetermined memory area of image processing workstation 3 as core line information CL representing the extraction result (#3).

Here, any known method may be used for extracting the coronary artery CA and core line CL. For example, line structures (blood vessels) of various sizes in a three-dimensional medical image V may be extracted by extracting a cardiac region from the three-dimensional medical image V by threshold processing based on the CT value representing myocardium and the like, then performing a multi-resolution conversion on a three-dimensional medical image representing the cardiac region, performing eigenvalue analysis of Hessian matrix on an image of each resolution, and integrating analysis results of the image of each resolution as described for example, Y. Sato, et al., "Three-dimensional multi-scale line filter for segmentation and visualization of curvilinear structures in medical images.", Medical Image Analysis, June, 1998, Vol. 2, No. 2, p.p. 143-168. Then, using a minimum spanning tree algorithm, the center point of each of the extracted line structures are connected to obtain tree structure data representing a coronary artery CA. Here, the line connecting the center points becomes a core line CL. Then, a cross-section orthogonal to the core line is obtained at each point on the core line of the extracted coronary artery CA (each node of the tree structure data). Thereafter, a contour of the coronary artery CA is recognized in each cross-section using a known segmentation method, such as Graph-Cuts method or the like and information representing the contour is related to each node of the tree-structure data.

In the aforementioned method, the extraction of the coronary artery CA and the extraction of the core line CL are performed integrally, but a method in which each extraction processing is performed separately. For example, an arrangement may be adopted in which, based on a region growing method from a seed point set on a coronary artery by the user or the like, coronary artery extraction unit 31 extracts the coronary artery CA and core line extraction unit 32 extracts the core line CL by performing a known thinning process on the coronary artery CA. Further, a user interface may be provided to allow the user to manually correct the coronary artery CA and core line CL extracted by the methods described above.

Index value calculation unit 33 reads the three-dimensional medical image data V, coronary artery information CA, and core line information CL, then calculates an index value $IDX_{m,n}$ representing a characteristic of the coronary artery in each direction of radial visual lines $VL_n$ (n=0, 1, 2, ..., N−1) with each of a plurality of points $P_m$ (m=0, 1, 2, ..., M) as each viewpoint, as schematically illustrated in FIG. 4, and stores the index value in a predetermined memory area of image processing workstation 3 (#4). Here, each visual line $VL_n$ at each point $P_m$ on the core line CL is on a cross-section passing through each point and orthogonal to the core line CL. Because, the core line CL is a curved line as a whole, a small section adjacent to each point $P_m$ is approximated as a straight line section and a direction orthogonal to the approximated straight line in the section is determined to be the direction orthogonal to the core line CL. For example, the direction of the core line CL at the point $P_m$ may be the direction of a straight line passing through points $P_{m-1}$ and $P_{m+1}$ before and after the point $P_m$. Further, the index value $IDX_{m,n}$ is related to information representing a position in the direction of the core line CL and information representing a direction of the visual line at the position.

Figure 5A:
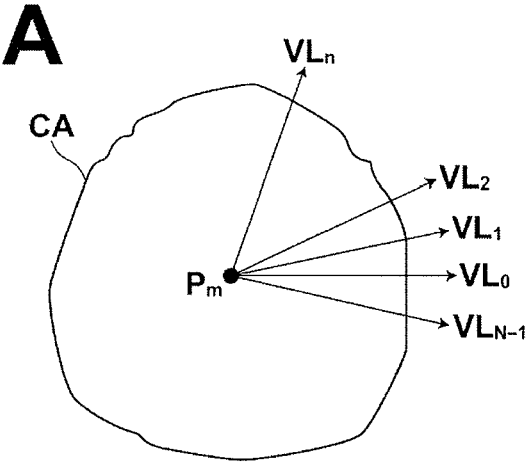
FIG. 5A is an orthogonal cross-section of a coronary artery for explaining how to calculate an index value representing the type of plaque of the coronary artery.

In the present embodiment, an index value representing a type of plaque is calculated as a specific example of index value $IDX_{m,n}$ representing a characteristic of a coronary artery. That is, CT values representing an intracoronary artery have a relationship of hard plaque>lumen>soft plaque, so that the type of plaque may be determined using a signal value of the intracoronary artery. FIG. 5A schematically illustrates an orthogonal cross-section at a point $P_m$ on a core line CL of a coronary artery. Index value calculation unit 33 calculates, with respect to each of N radial visual lines $VL_0$ to $VL_{N-1}$ with the point $P_m$ as the viewpoint, an average signal value from the viewpoint $P_m$ to the contour CA of the coronary artery as the index value $IDX_{m,n}$ representing the type of plaque. An area having an index value $IDX_{m,n}$ greater than that representing the intracoronary artery implies that a hard plaque is present in the area, while an area having an index value smaller than that representing the intracoronary artery implies that a soft plaque is present in the area. Alternatively, a maximum signal value from the viewpoint $P_m$ to the contour CA of the coronary artery in each visual line $VL_n$ may be calculated as the index value $IDX_{m,n}$ of the hard plaque, while a minimum signal value from the viewpoint $P_m$ to the contour CA of the coronary artery in each visual line $VL_n$ may be calculated as the index value $IDX_{m,n}$ of the soft plaque. Further, in order to avoid the influence of noise in the image, for example, a 90 percentile value or a 10 percentile value may be calculated.

Figure 7A:
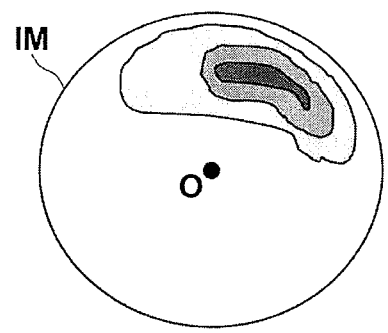
FIG. 7A schematically illustrates an example characteristic map image represented by a polar coordinate system.

Map image generation unit 34 generates a characteristic map image IM representing a characteristic inside of the coronary artery CA by reading the index value $IDX_{m,n}$ and mapping the index value $IDX_{m,n}$ to a coordinate plane with the position in the direction of the core line CL of the coronary artery CA as x coordinate component and the direction of the radial visual line $VL_n$ at each point on the core line CL as y coordinate component and stores the image in a predetermined memory area of image processing workstation 3 (#5). In the present embodiment, the x coordinate component is represented by a distance $x_m$ between each point $P_m$ and the point $P_0$ along the core line CL and the y coordinate component is represented by an angle $θ_n$ formed by each visual line $VL_n$ with respect to $VL_0$. FIG. 6A illustrates an example coordinate plane of a polar coordinate system to which index values $IDX_{m,n}$ are mapped. As illustrated in FIG. 6A, the x coordinate component is represented by a radius of a circle centered on the origin O and the y coordinate component is represented by a rotation angle from the reference axis $y_0$ in the counter-clockwise direction. Map image generation unit 34 maps the index value $IDX_{m,n}$ of the visual line $VL_n$, shown in FIG. 5A, with the point $P_m$ having a distance $x_m$ from the point $P_0$ as the viewpoint and forms an angle $θ_n$ with respect to the visual line $VL_0$ to a point $P_{m,n}$ on a circle having a radius of $x_m$ from the origin O and a rotation angle of $θ_n$ from the reference axis $y_0$ in the counter-clockwise direction. FIG. 7A schematically illustrates an example of characteristic map image IM generated by mapping the index value $IDX_{m,n}$ in the direction of each visual line $VL_n$ at each point $P_m$ on the core line in the manner as described above. As illustrated in FIG. 7A, index values $IDX_{m,n}$ are mapped using different colors, densities, patterns, and the like according to the range of values. The initial value of imaging range of the characteristic map image IM in the direction of core line CL may be given in advance as a startup parameter or the like.

Display control unit 35 reads the characteristic map image IM and causes the image to be displayed at a predetermined position of the display monitor of image processing workstation 3 (#6).

As described above, according to the first embodiment of the present invention, index value calculation unit 33 calculates an index value $IDX_{m,n}$ representing a characteristic of a coronary artery CA extracted from a three-dimensional medical image V in each direction of radial visual lines $VL_n$ orthogonal to a core line CL at each of a plurality of points $P_m$ on the core line CL with each point $P_m$ as each viewpoint, and map image generation unit 34 generates a characteristic map image IM by mapping the index value $IDX_{m,n}$ calculated in each direction of the visual lines $VL_n$ at each point $P_m$ on the core line CL to a coordinate plane defined by a first coordinate component representing a position in a direction of the core line CL and a second coordinate component representing a direction of the radial visual lines $VL_n$. This allows the characteristic of the coronary artery in the three-dimensional medical image V to be obviously visualized by the characteristic map image IM, thereby reducing the time and effort to observe a plurality of images by changing the display range as required in the case in which observation is performed using a conventional image (orthogonal cross-section image or CPR image) representing the coronary artery CA and improving the efficiency of observation.

In the characteristic map image IM of polar coordinate system shown in FIG. 6A or 7A, positional relationship in the circumferential direction on the coordinate plane corresponds to the positional relationship in the contour (outer circumferential) direction of the coronary artery CA in a cross-section orthogonal to the core line CL of the coronary artery CA. Thus, the image allows the observation of a characteristic (plaque distribution) of the coronary artery CA with a sense of position close to that of an orthogonal cross-section image orthogonal to the core line CL of the coronary artery CA.

Figure 5B:
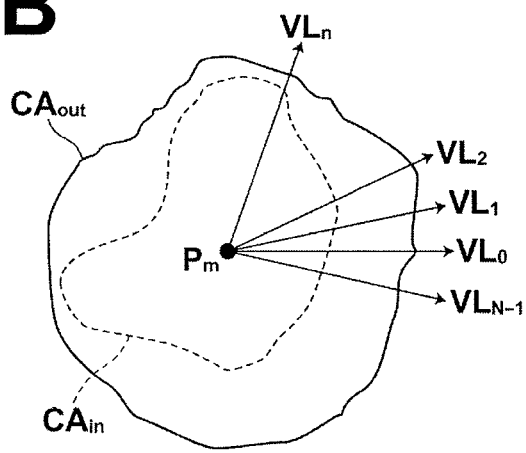
FIG. 5B is an orthogonal cross-section of a coronary artery for explaining how to calculate an index value representing a coronary artery stenosis rate.

In the embodiment described above, an index value representing the type of plaque is used as the index value $IDX_{m,n}$ representing a characteristic of a coronary artery CA. Another specific example may be a stenosis rate. More specifically, with respect to each of N radial visual lines $VL_0$ to $VL_{N-1}$ with the point $P_m$ as the viewpoint, index value calculation unit 33 performs searching from the viewpoint $P_m$ toward the contour CA of the coronary artery to obtain a boundary position between the signal value representing the lumen and the signal value representing the plaque, as schematically illustrated in FIG. 5B. In FIG. 5B, a curved line connecting the boundary positions is designated as an inner contour $CA_{in}$ of the coronary artery and the outer contour obtained at the time of extracting the coronary artery is designated as $CA_{out}$. With respect to each visual line $VL_n$, index value calculation unit 33 calculates the stenosis rate in the following manner:

(Length of outer diameter $P_mCA_{out}$–length of inner diameter $P_mCA_{in}$)×100/length of outer diameter $P_mCA_{out}$.

Alternatively, the following may be calculated for each visual line $VL_n$ as the stenosis rate:

Number of search points having a signal value representing plaque×100/total number of search points on the visual line.

A second embodiment of the present invention is an embodiment that generates a characteristic map image in which index values are mapped to a coordinate plane of a rectangular coordinate system, and the block diagram and flowchart of the second embodiment are identical to those of the first embodiment.

Figure 7B:
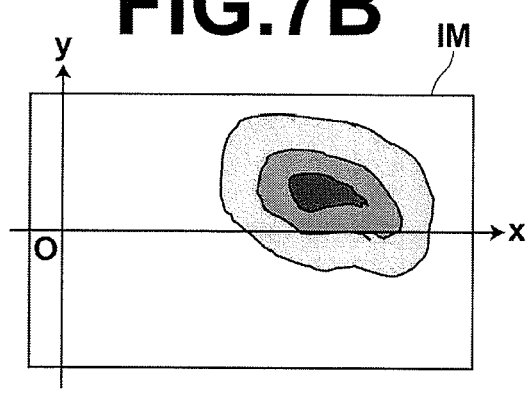
FIG. 7B schematically illustrates an example characteristic map image represented by a rectangular coordinate system.

FIG. 6B illustrates an example coordinate plane of a rectangular coordinate system to which index values $IDX_{m,n}$ are mapped in the present embodiment. As illustrated in FIG. 6B, a distance $x_m$ along the core line CL between each point $P_m$ and the point $P_0$ on the core line CL is represented on x axis and the angle $θ_n$ formed by each visual line $VL_n$ with respect to the visual line $VL_0$ is represented on y axis. Here, the angle $θ_n$ takes values from 0 to 180 degrees from the visual line $VL_0$ in counter-clockwise direction and takes values from 0 to −180 degrees from the visual line $VL_0$ in clockwise direction. Thus, in the present embodiment, map image generation unit 34 maps the index value $IDX_{m,n}$ of the visual line $VL_n$, shown in FIG. 5A, with the point $P_m$ having a distance $x_m$ from the point $P_0$ as the viewpoint, and forms an angle $θ_n$ ($0° \leq θ_n \leq 180°$) with the visual line $VL_0$ to a point $P_{m,n}$ with a coordinate value ($x_m$, $θ_n$). Further, an index value $IDX_{m,n}$ of the visual line $VL_{N-1}$ with the point $P_m$ having a distance $x_m$ from the point $P_0$ as the viewpoint, and forms an angle $θ_{N-1}$ ($-180° \leq θ_{N-1} \leq 0°$) is mapped to a point $P_{m,N-1}$ with a coordinate value ($x_m$, $θ_{N-1}$). FIG. 7B schematically illustrates an example of characteristic map image IM generated by mapping the index value $IDX_{m,n}$ in the direction of each visual line $VL_n$ at each point $P_m$ on the core line in the manner as described above. In this example of coordinate plane, the origin O is determined such that the angle $θ_n$ formed by each visual line $VL_n$ with respect to the visual line $VL_0$ takes a value in the range from −180 degrees to 180 degrees but, for example, the origin O may be determined such that the angle $θ_n$ takes a value in the range from 0 degree to 360 degrees.

As described above, in the second embodiment, a characteristic map image IM by a rectangular coordinate system, as illustrated in FIG. 6B, 7B, or the like, is generated. This allows a characteristic (plaque distribution) of the coronary artery CA to be observed obviously with the vessel wall of the coronary artery CA being cut open and the interior of the coronary artery being represented in an exposing manner. Further, as the y axis represents the angle $\theta_n$ formed by each visual line $VL_n$ with respect to the visual line $VL_0$ at each point $P_m$ on the coronary artery CA, so that observation may be performed with the size of the coronary artery CA at each point $P_m$ being normalized.

A third embodiment of the present invention is an embodiment that generates a characteristic map image in which two types of index values are mapped, and the block diagram and flowchart of the third embodiment are identical to those of the first embodiment.

Figure 8A:
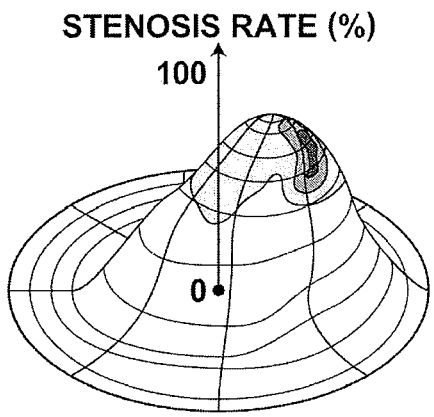
FIG. 8A schematically illustrates a first example of characteristic map image to which two types of characteristic amounts are mapped.
Figure 8B:
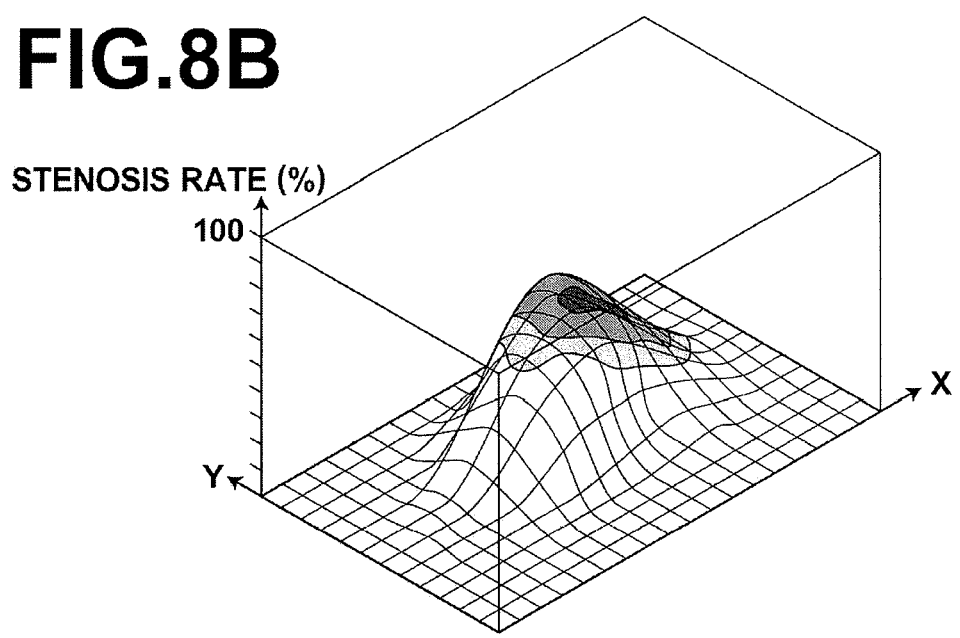
FIG. 8B schematically illustrates a second example of characteristic map image to which two types of characteristic amounts are mapped.

In the present embodiment, index value calculation unit 33 calculates both an index value $IDX1_{m,n}$ representing the type of plaque and an index value $IDX2_{m,n}$ representing the stenosis rate. Then, map image generation unit 34 maps either one of the two types of index values (e.g., index value $IDX1_{m,n}$ representing the type of plaque) as in the first or second embodiment and maps the other type of index value (e.g., index value $IDX2_{m,n}$ representing the stenosis rate) as a coordinate value of z axis representing the height direction orthogonal to the coordinate plane in the first or second embodiment, thereby generating a characteristic map image IM in which the two types of index values $IDX1_{m,n}$, $IDX2_{m,n}$ are mapped. FIG. 8A illustrates an example of characteristic map image in which z axis representing the height direction is added to the coordinate plane of the polar coordinate system of FIG. 7A, while FIG. 8B illustrates an example of characteristic map image in which z axis representing the height direction is added to the coordinate plane of rectangular coordinate system of FIG. 7B. As illustrated in each drawing, in the present embodiment, the characteristic map image is like a pseudo three-dimensional graph representing, for example, stenosis rates as heights in the z axis direction using contour lines or a mesh with a color representing a distribution of plaque.

As described above, in the third embodiment of the present invention, distributions of the two types of index values can be obviously understood and the observation efficiency is further improved. For example, it is possible to understand as to whether or not a stenosis is developed at a position of a plaque only from the characteristic map image IM of the present embodiment.

In the present embodiment, characteristic map image IM is represented pseudo three-dimensionally, so that a position in the back side (rear side) with respect to the viewpoint of the characteristic map image IM is hard to observe. It is preferable, therefore, that the viewpoint and visual line with respect to the characteristic map image IM be settable and changeable. This allows the user to perform observation by rotating the characteristic map image IM.

A fourth embodiment of the present invention is an embodiment in which an orthogonal cross-section image with respect to the core line of a coronary artery and a characteristic map image are displayed cooperatively. FIG. 9 is a block diagram of a part of image processing workstation 3 relevant to medical image processing of the fourth embodiment of the present invention. As illustrated in FIG. 9, the medical image processing of the present embodiment is realized by orthogonal cross-section image generation unit 36 and cross-section position change receiving unit 37, in addition to coronary artery extraction unit 31, core line extraction unit 32, index value calculation unit 33, map image generation unit 34, and display control unit 35 identical to those of the first embodiment. Further, the three-dimensional medical image V, coronary artery information CA, core line information CL, index value $IDX_{m,n}$, characteristic map image IM, cross-section position information PR, and orthogonal cross-section image IS are data written into and read out from a predetermined memory area of image processing workstation 3 by each processing unit described above.

FIG. 10 is a flowchart illustrating a flow of user operation, calculation processing, display processing, and the like under the execution of medical image processing software of the present embodiment. As shown in FIG. 10, steps from #11 to #15 are identical to steps #1 to #5 (FIG. 3) of the first embodiment.

Figure 11:
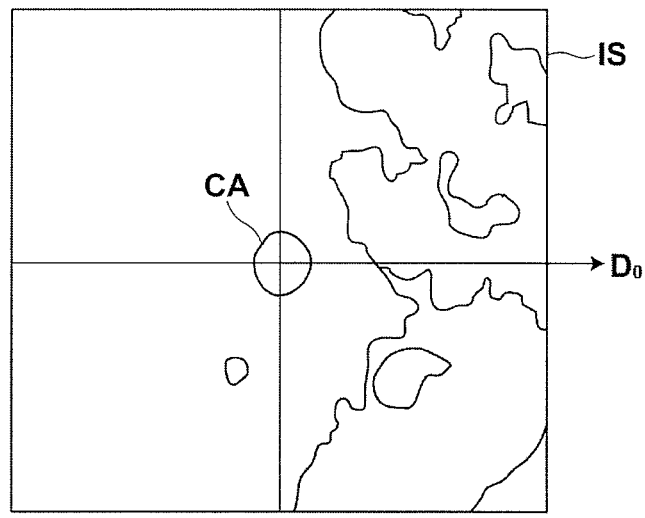
FIG. 11 schematically illustrates an example orthogonal cross-section image of a coronary artery.

Thereafter, using a known method, orthogonal cross-section image generation unit 36 generates an orthogonal cross-section image IS of a cross-section which passes through a given reference point (cross-section position) on a core line CL of a coronary artery CA and is orthogonal to the core line CL at the reference point from a three-dimensional medical image V (#16). FIG. 11 illustrates an example of generated orthogonal cross-section image IS of a coronary artery CA. Here, the reference point (cross-section position) may be a default position given by a program startup parameter or the like, such as the position corresponding to the origin O of the characteristic map image IM, intermediate position of imaging range in the direction of the core line CL of the characteristic map image IM (midpoint between the points $P_0$ and $P_M$ in FIG. 4), position where plaque is concentrated the most, or position where the coronary artery CA is stenosed the most. In the case where the characteristic map image IM is an image based on a polar coordinate system, orthogonal cross-section image generation unit 36 generates the orthogonal cross-section image IS such that the reference axis $y_0$ in characteristic map image IM (FIG. 6A) and axis $D_0$ (FIG. 11, corresponding to the visual line $VL_0$ in FIGS. 5A, 5B) of the orthogonal cross-section image IS corresponding to the reference axis $y_o$ are oriented in the same direction.

Figure 12A:
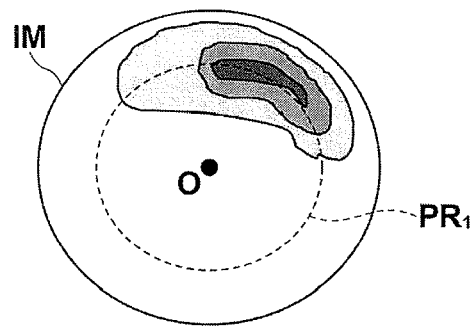
FIG. 12A is an example in which positions of a cross-section image are superimposed on a characteristic map image represented by a polar coordinate system.
Figure 12B:
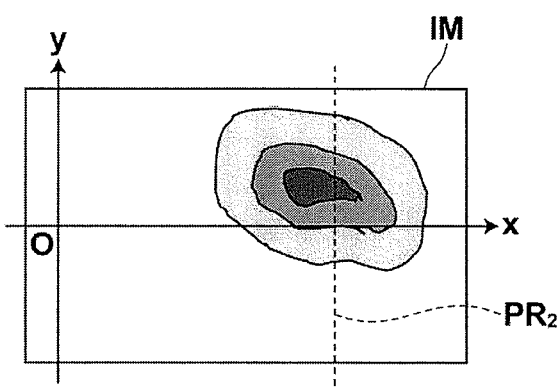
FIG. 12B is an example in which positions of a cross-section image are superimposed on a characteristic map image represented by a rectangular coordinate system.

Display control unit 35 causes the characteristic map image IM generated by map image generation unit 34 and the orthogonal cross-section image IS generated by orthogonal cross-section image generation unit 36 to be displayed side by side at predetermined positions of the display monitor of image processing workstation 3 (#17). Here, as illustrated in the characteristic map image IM of a polar coordinate system of FIG. 12A, a circle $PR_1$ corresponding to the position of reference point (position of orthogonal cross-section) may be displayed in a visually recognizable manner (here, the dotted line). Further, as illustrated in FIG. 12B, the position of the reference point is represented by a straight line $PR_2$ in the characteristic map image IM of a rectangular coordinate system.

Here, cross-section position change receiving unit 37 detects an operation for specifying an arbitrary position in the characteristic map image IM (e.g., mouse click operation), identifies the position PR on the core line CL corresponding to the specified position, and stores the position PR in a predetermined memory area (#18).

Orthogonal cross-section image generation unit 36 reads the identified position PR on the core line CL and regenerates an orthogonal cross-section image passing the position PR (#19). Then, display control unit 35 updates the display of orthogonal cross-section image IS to the regenerated image (#20). At this time, the display of the circle $PR_1$ or straight line $PR_2$ illustrated in the characteristic map image IM of FIG. 12A or FIG. 12B is updated to a position corresponding to the position PR identified by cross-section position change receiving unit 37.

As described above, according to the fourth embodiment of the present invention, orthogonal cross-section image generation unit 36 generates an orthogonal cross-section image of a cross-section orthogonal to the core line CL at a given reference point and display control unit 35 may cause the characteristic map image IM and orthogonal cross-section image IS to be displayed while the position of the reference point in the characteristic map image IM is represented in a visually recognizable manner. This allows the user to observe the characteristic map image IM and orthogonal cross-section image IS by easily understanding the positional correspondence relationship between them, whereby a more exhaustive observation of a coronary artery CA may be performed more efficiently.

Further, in the case where the characteristic map image IM is an image based on a polar coordinate system, orthogonal cross-section image generation unit 36 generates the orthogonal cross-section image IS such that the reference axis $y_0$ in the characteristic map image IM and the axis $D_0$ of the orthogonal cross-section image corresponding to the reference axis $y_0$ are oriented in the same direction, so that the both images may be observed with the positions of characteristic map image IM and orthogonal cross-section image IS in the circumferential direction (central angle) being aligned with each other.

In the embodiment described above, an arrangement may be adopted in which an operation for rotating the characteristic map image IM of polar coordinate system and/or orthogonal cross-section image IS on the image plane centered on the position corresponding to the core line CL is received and according to the rotational operation received for either one of the images, the other image is also rotated in the same manner. This allows the both images to be displayed cooperatively even when the rotational operation is performed.

Figure 13:
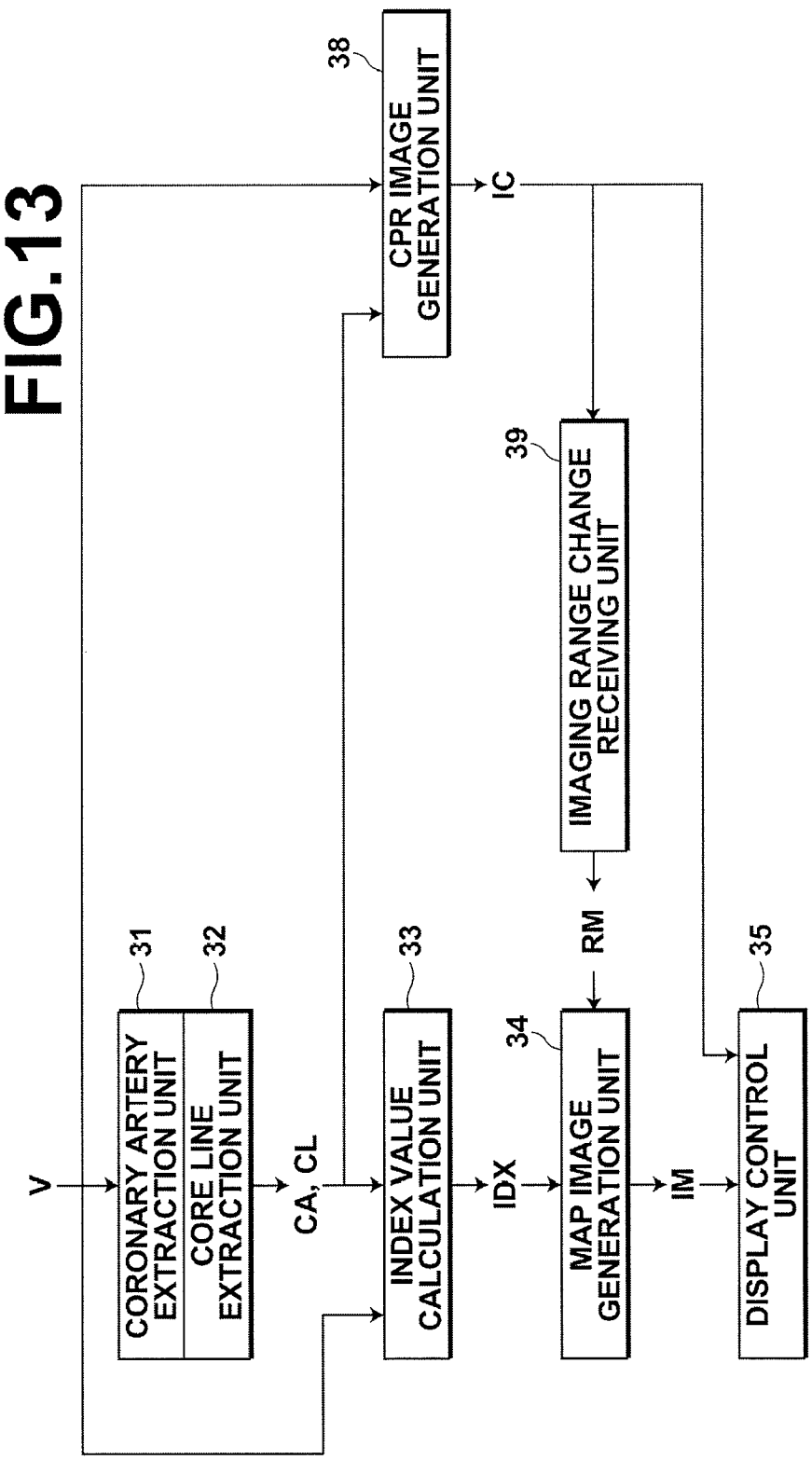
FIG. 13 is a block diagram schematically illustrating a configuration and a processing flow for realizing a medical image processing function in a fifth embodiment of the present invention.

A fifth embodiment of the present invention is an embodiment in which a CPR image along the core line of a coronary artery and a characteristic map image are displayed cooperatively. FIG. 13 is a block diagram of a part of image processing workstation 3 relevant to medical image processing of the fifth embodiment of the present invention. As illustrated in FIG. 13, the medical image processing of the present embodiment is realized by CPR image generation unit 38 and imaging range change receiving unit 39, in addition to coronary artery extraction unit 31, core line extraction unit 32, index value calculation unit 33, map image generation unit 34, and display control unit 35 identical to those of the first embodiment. Further, the three-dimensional medical image V, coronary artery information CA, core line information CL, index value $IDX_{m,n}$, characteristic map image IM, CPR image IC, and a map imaging range RM which is a range in the direction of the core line CL of a coronary artery CA represented in characteristic map image IM are data written into and read out from a predetermined memory area of image processing workstation 3 by each processing unit described above.

Figure 14:
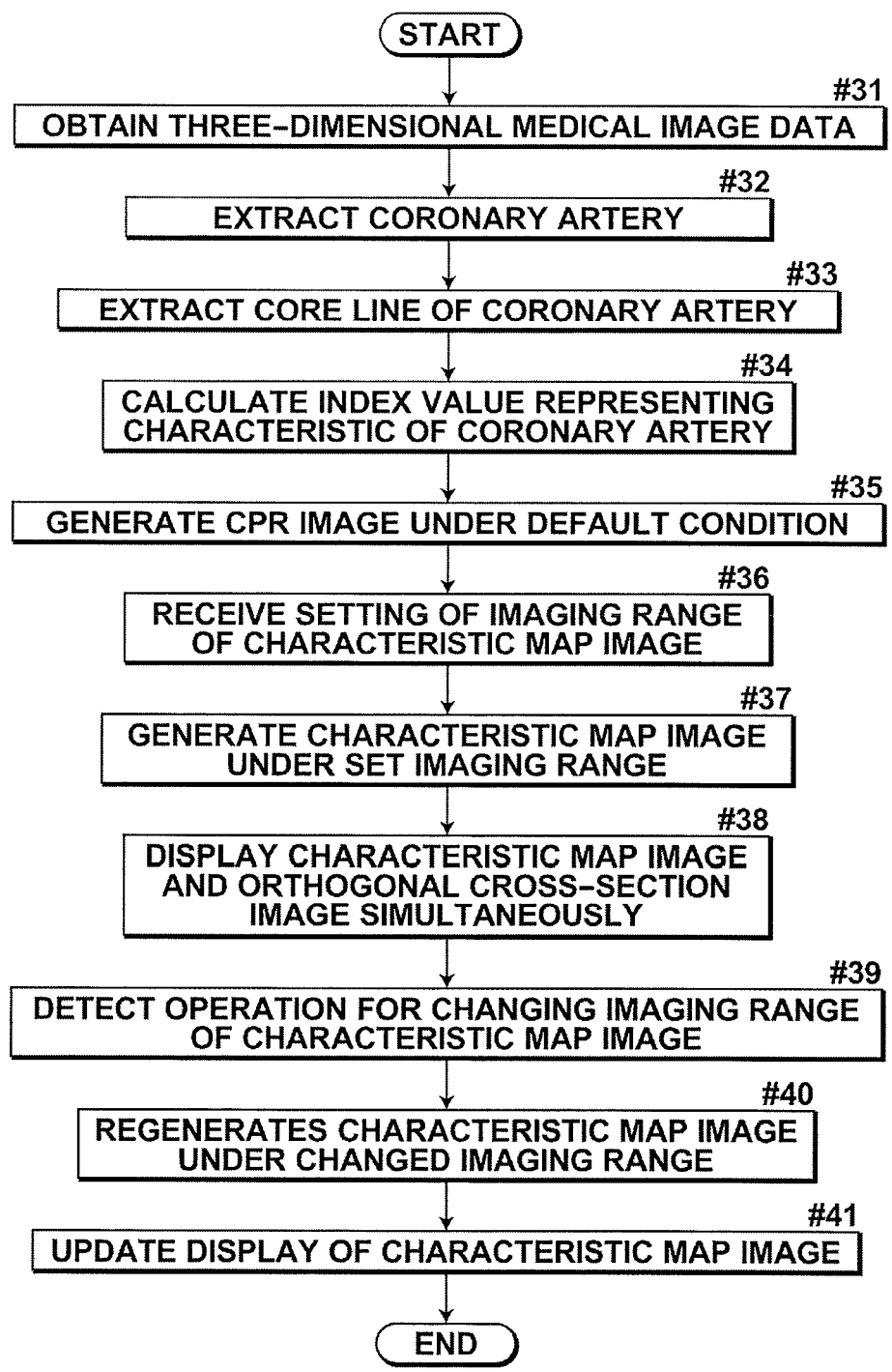
FIG. 14 is a flowchart illustrating a medical image processing flow using a medical image diagnosis system according to the fifth embodiment of the present invention.

FIG. 14 is a flowchart illustrating a flow of user operation, calculation processing, display processing, and the like under the execution of medical image processing software of the present embodiment. As shown in FIG. 14, steps from #31 to #34 are identical to steps #1 to #4 (FIG. 3) of the first embodiment.

Figure 15:
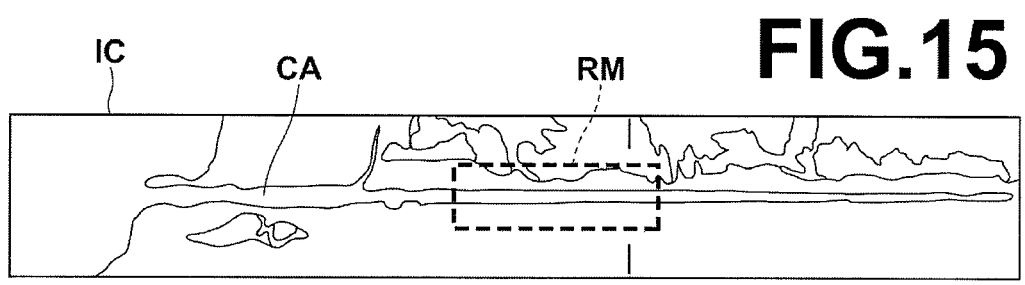
FIG. 15 illustrates an example in which an imaging range of a characteristic map image is superimposed on a CPR image of a coronary artery.

Thereafter, using a known method, CPR image generation unit 38 generates a CPR image IC by a curved surface along the core line of the coronary artery CA from a three-dimensional medical image V (#35). FIG. 15 illustrates an example of generated CPR image IC of coronary artery. FIG. 15 illustrates an image generated by a straight CPR method, but other CPR methods, such as stretch CPR, may also be used. The imaging range of the CPR image IC is given by a program startup parameter or the like.

Here, imaging range change receiving unit 39 detects an operation for setting a map imaging range in the direction of the core line CL of the coronary artery to be represented in the characteristic map image IM and stores the detected map imaging range RM in a predetermined memory area (#36). More specifically, a writing operation of a rectangular frame, such as that shown in FIG. 15, using a mouse or the like is detected by imaging range change receiving unit 39 and the range of the core line CL included in the rectangle is identified as the map imaging range RM. Here, a coordinate value conversion is performed, as required, based on the positional correspondence relationship in the direction of the core line CL between the CPR image IC and characteristic map image IM.

Then, map image generation unit 34 generates a characteristic map image IM as in the first embodiment based on the index value $IDX_{m,n}$ and map imaging range RM set by imaging range change receiving unit 39 (#37), and display control unit 35 causes the characteristic map image IM generated by map image generation unit 34 and CPR image IC generated by CPR image generation unit 38 to be displayed side by side at predetermined positions of the display monitor of image processing workstation 3 (#38).

Further, imaging range change receiving unit 39 detects an operation for changing the map imaging range of the characteristic map image IM and stores the changed map imaging range RM in a predetermined memory area (#39). More specifically, a mouse drag operation for enlarging or reducing the rectangular frame RM shown in FIG. 15 in the direction of the core line CL, an operation for shifting the rectangular frame RM along the core line CL, or the like is detected by imaging range change receiving unit 39 and the range of the core line CL included in the post-operated rectangular frame RM is identified as the changed map imaging range RM.

Map image generation unit 34 regenerates a characteristic map image IM based on the changed map imaging range RM (#40), and display control unit 35 updates the display of characteristic map image IM to the regenerated image (#41). At that time, the display of the rectangular frame RM representing the map imaging range in the CPR image IC is also updated.

As described above, according to the fifth embodiment of the present invention, CPR image generation unit 38 generates a CPR image IC along the core line CL, and display control unit 35 may cause the characteristic map image IM and CPR image IC to be displayed while the imaging range RM of the characteristic map image IM in the CPR image IC is represented in a visually recognizable manner. This allows the user to examine the characteristic map image IM and CPR image IC by easily understanding the positional correspondence relationship between them, whereby a more exhaustive observation of a coronary artery CA may be performed more efficiently.

In the embodiment described above, the imaging range of the characteristic map image IM is displayed in the CPR image IC, but the imaging range of the CPR image IC may be displayed in the characteristic map image IM in the case where the imaging range of the CPR image is narrower than that of the characteristic map image IM. In this case, an operation for the enlargement, reduction, or shifting of the CPR image IC may be received in the characteristic map image IM, then the CPR image IC is regenerated accordingly, and the display of each image may be updated. Such embodiment allows an image display appropriate for an observation flow to be realized in which the coronary artery CA is generally observed in the characteristic map image IM and then locally in detail in the CPR image IC.

Figure 16:
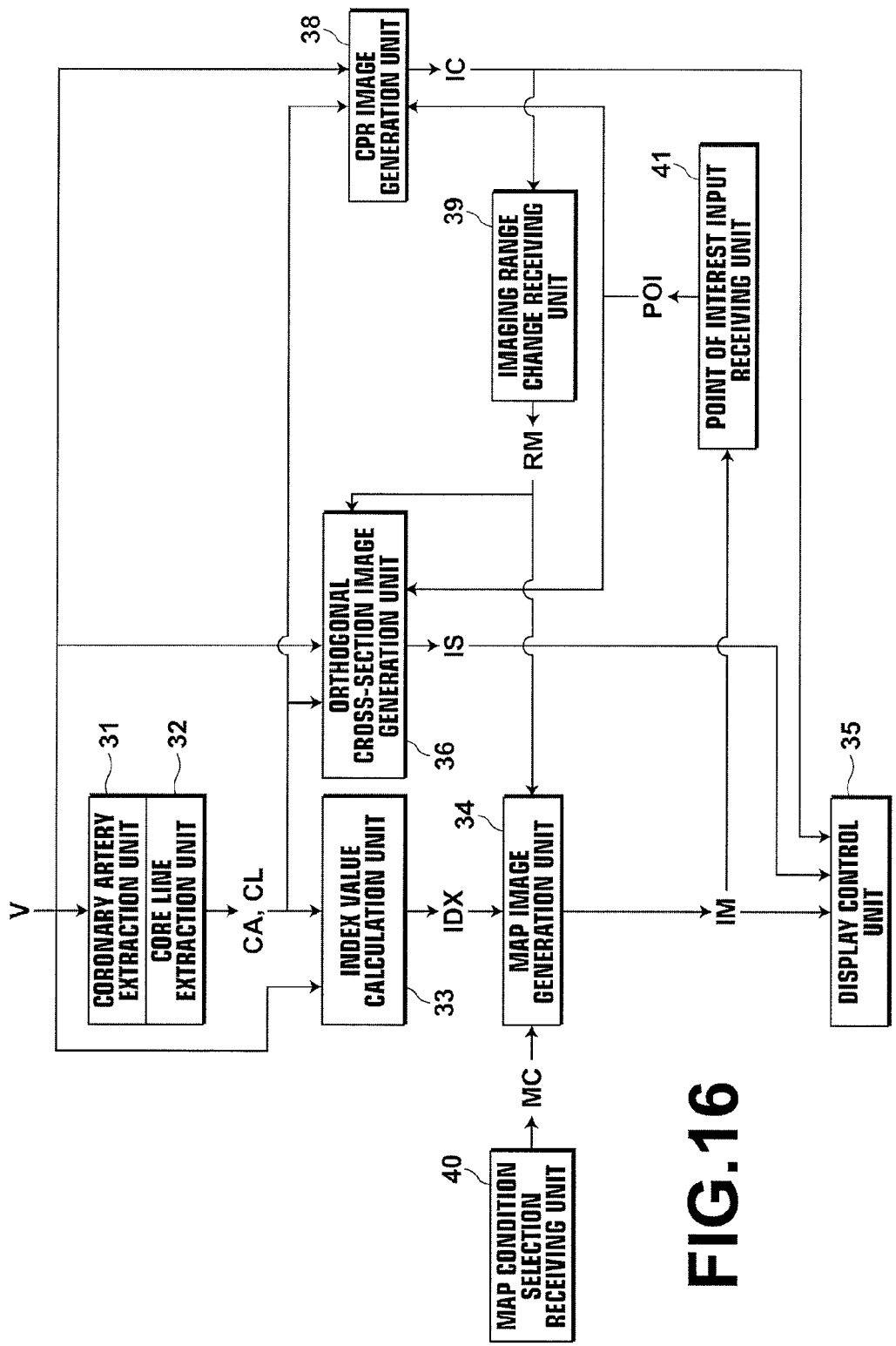
FIG. 16 is a block diagram schematically illustrating a configuration and a processing flow for realizing a medical image processing function in a sixth embodiment of the present invention.

A sixth embodiment of the present invention is an embodiment in which an orthogonal cross-section image, a CPR image, and a characteristic map image are displayed cooperatively. FIG. 16 is a block diagram of a part of image processing workstation 3 relevant to medical image processing of the sixth embodiment of the present invention. As illustrated in FIG. 16, the medical image processing of the present embodiment is realized by map condition selection receiving unit 40 and point of interest input receiving unit 41, in addition to coronary artery extraction unit 31, core line extraction unit 32, index value calculation unit 33, map image generation unit 34, and display control unit 35 identical to those of the first embodiment, orthogonal cross-section image generation unit 36 identical to that of the fourth embodiment, and CPR image generation unit 38 and imaging range change receiving unit 39 identical to those of the fifth embodiment. Further, the three-dimensional medical image V, coronary artery information CA, core line information CL, index value $IDX_{m,n}$, characteristic map image IM, orthogonal cross-section image IS, CPR image IC, map imaging range RM, map condition MC, and point of interest POI are data written into and read out from a predetermined memory area of image processing workstation 3 by each processing unit described above.

In the present embodiment, a CPR image IC under the default condition and a characteristic map image IM within the map imaging range set by the user are generated first as in steps #31 to #37 of the processing flow in the fifth embodiment. Then, an orthogonal cross-section image at the default position (intermediate position of the map imaging range here) is generated as in step #16 of the processing flow in the fourth embodiment. Thereafter, display control unit 35 causes the generated characteristic map image IM, orthogonal cross-section image IS, and CPR image IC to be displayed side by side on the display monitor of image processing workstation 3.

Figures 17, 18:
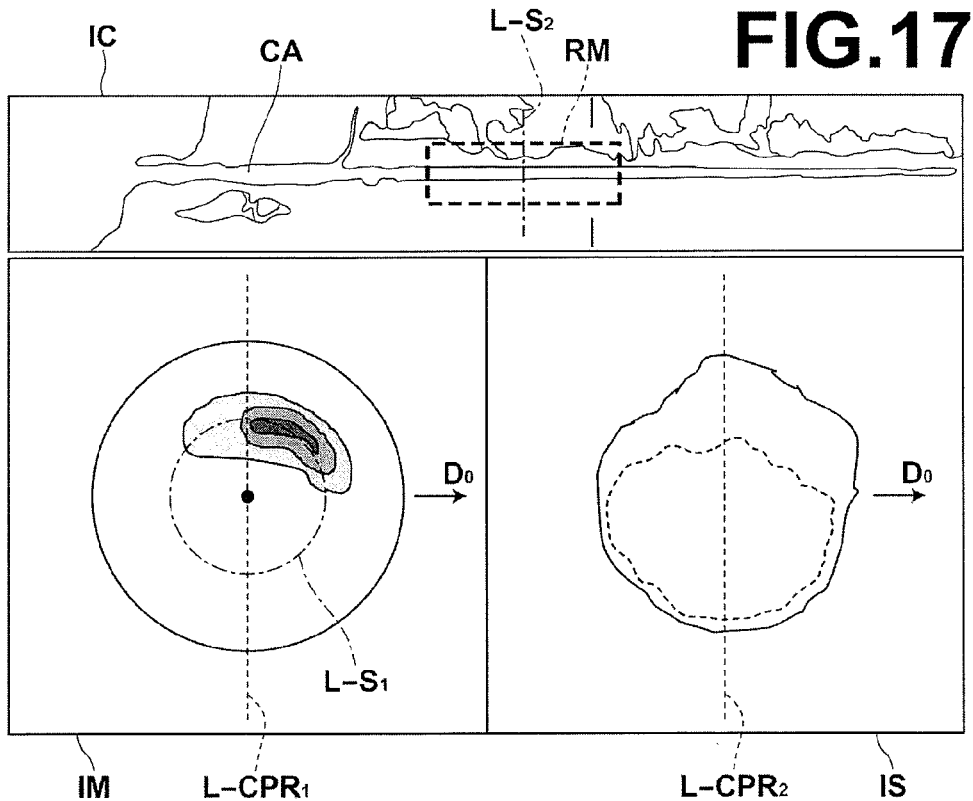
FIG. 17 schematically illustrates a display example in which a characteristic map image, orthogonal cross-section image, and CPR image in the sixth embodiment of the present invention are displayed.
FIG. 18 illustrates an example user interface for setting a positional relationship between the map imaging range and orthogonal cross-section.

FIG. 17 schematically illustrates an example screen to be displayed. As illustrated in FIG. 17, a rectangular frame RM representing the imaging range of the characteristic map image IM and an auxiliary line $L-S_2$ representing the cross-section position of the orthogonal cross-section image IS are displayed in the CPR image IC in a superimposed manner. Further, an auxiliary line $L-CPR_1$ representing the curved surface of the CPR image IC and an auxiliary line $L-S_1$ representing the cross-section position of the orthogonal cross-section image IS are displayed in the characteristic map image IM in a superimposed manner. Still further, an auxiliary line $L-CPR_2$ representing the curved surface of the CPR image IC is displayed in the orthogonal cross-section image IS in a superimposed manner. Noted that, in the present embodiment, the direction of the axis $D_0$ in the characteristic map image IM is aligned in the circumferential direction such that the index value $IDX_{m,n}$ in the direction of the axis $D_0$ in the orthogonal cross-section image IS is displayed, as in the fourth embodiment.

Here, in the case where an operation for changing the imaging range RM is detected by imaging range change receiving unit 39 in the CPR image IC, as in step #39 of the fifth embodiment, not only the characteristic map image IM is regenerated by map image generation unit 34 based on the changed map imaging range RM but also the orthogonal cross-section image is regenerated by orthogonal cross-section image generation unit 36 with the intermediate position of the changed map imaging range RM as a new orthogonal cross-section position. That is, in the present embodiment, the positional relationship between the map imaging range and orthogonal cross-section is fixed.

In the case where this positional relationship is desired to be changed, in the present embodiment, the user may select "Map Condition Change" from a menu displayed on the screen (not shown). Then, map condition selection receiving unit 40 causes a setting screen shown, by way of example, in FIG. 18 to be displayed. As shown in FIG. 18, the user may select the positional relationship between the map imaging range and orthogonal cross-section on the screen. The display example of FIG. 17 illustrates the case in which "EVEN DISPLAY OF CHARACTERISTIC MAP BEFORE AND AFTER ORTHOGONAL CROSS-SECTION" is selected and the position of the orthogonal cross-section corresponds to the intermediate position of the map imaging range RM. Now, for example, if the user selects "PRIORITY DISPLAY OF CHARACTERISTIC MAP IN FRONT SIDE OF CROSS-SECTION" as the map condition, map condition selection receiving unit 40 receives the selection information and outputs the map condition MC to a predetermined memory area. Map image generation unit 34 reads the map condition MC, changes the map imaging range RM such that the front side of the orthogonal cross-section position $L-S_2$ (right side in FIG. 17) becomes wider (longer), and regenerates the characteristic map image IM based on the changed map imaging range RM. Then, display control unit 35 updates the display of the characteristic map image IM to the regenerated image, as well as the auxiliary line $L-S_1$ in the characteristic map image IM and the rectangular frame RM in the CPR image IC.

Figure 19:
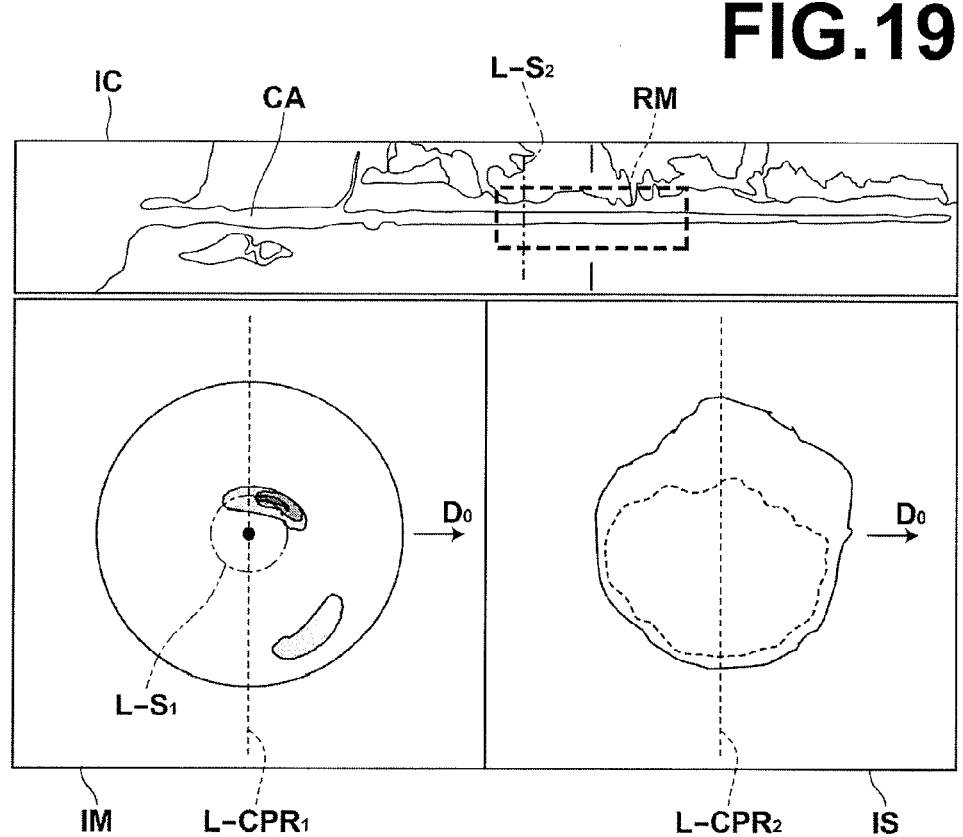
FIG. 19 illustrates a display example in which the characteristic map in the front side of an orthogonal cross-section is displayed in a priority manner.

FIG. 19 illustrates an example display of characteristic map image IM, orthogonal cross-section image IS, and CPR image IC after the selection of map condition is changed. As illustrated in FIG. 19, the orthogonal cross-section position $L-S_2$ is not changed and only the rectangular frame RM representing the map imaging range is changed in the CPR image IC. In the characteristic map image IM, the index value $IDX_{m,n}$ at the orthogonal cross-section position $L-S_1$ is moved to a concentric circle of a smaller radius, and the index value $IDX_{m,n}$ in front of the orthogonal cross-section position $L-S_1$ (right side in the CPR image IC) is displayed outside of the concentric circle $L-S_1$. In the mean time, the position of the orthogonal cross-section itself is not moved, so that the display of the orthogonal cross-section image IS is the same as that of FIG. 17.

In the case where "PRIORITY DISPLAY OF CHARACTERISTIC MAP IN BACK SIDE OF CROSS-SECTION" is selected by the user in the setting screen of FIG. 18, the rectangular frame RM representing the map imaging range is moved such that the left side of the orthogonal cross-section position $L-S_2$ becomes longer in the CPR image in reverse of the description above and in the characteristic map image IM, the index value $IDX_{m,n}$ at the orthogonal cross-section position $L-S_1$ is moved to a concentric circle having a larger radius and the index value $IDX_{m,n}$ in the back side of the orthogonal cross-section position $L-S_1$ (left side in the CPR image IC) is displayed inside of the concentric circle $L-S_1$.

As described above, in the present embodiment, the positional relationship between the map imaging range and orthogonal cross-section is selectable by the user so that the characteristic map image IM, CPR image IC, and orthogonal cross-section image IS may be displayed cooperatively according to the preference of the user.

Note that the user interface for changing map condition is not limited to the example shown in FIG. 18. For example, the positional relationship between the map imaging range and orthogonal cross-section may be set by the use of a user interface identical to the CPR image IC in FIG. 17 in which the rectangular frame RM representing the map imaging range or the orthogonal cross-section position L-$S_2$ is moved by the user using a mouse or the like so that a desired positional relationship is obtained.

Figure 20:
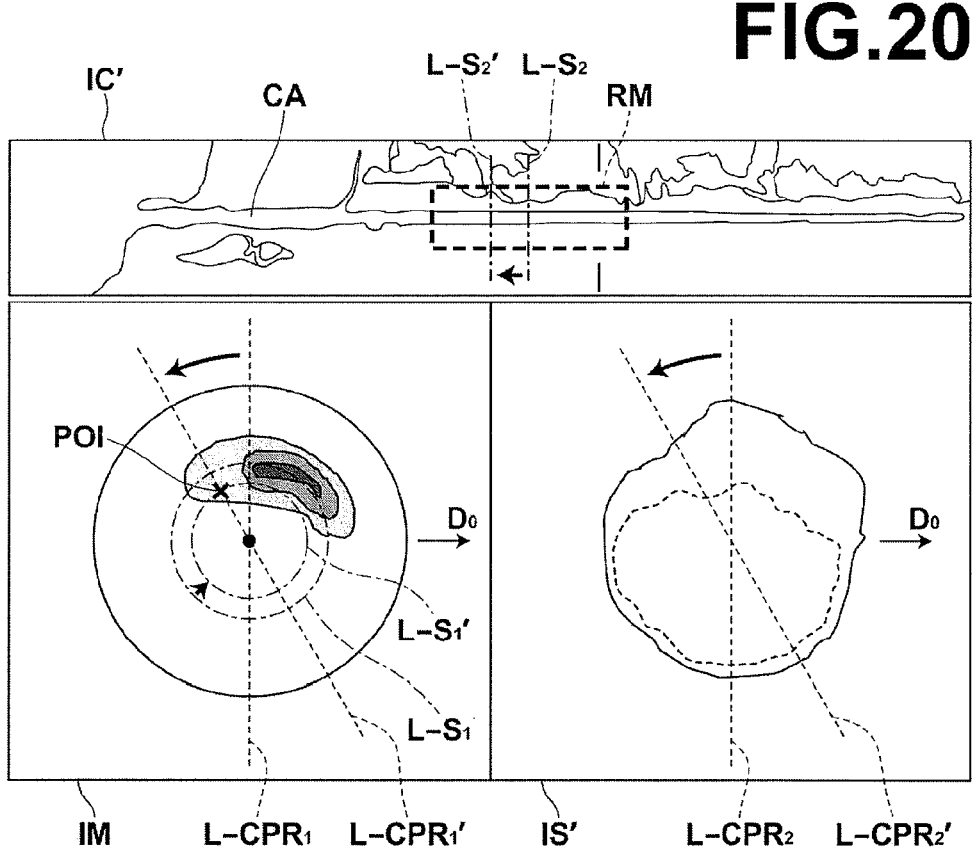
FIG. 20 schematically illustrates updating of each image due to specification of a point of interest.

Further, as illustrated in FIG. 20, an arrangement may be adopted in which the following are performed. In the case where an operation for specifying a point of interest (e.g., keep pressing a mouse button) is performed by the user in the characteristic map image IM, point of interest input receiving unit 41 detects the operation, then identifies the position on the core line CL corresponding to the specified position and the direction of the radial visual line $VL_n$, and stores the identified information in a predetermined memory area. Orthogonal cross-section image generation unit 36 reads the identified position on the core line CL and regenerates a cross-section image IS' passing through the position. In the mean time, CPR image generation unit 38 identifies the curved surface passing through the direction of the identified radial visual line $VL_n$ at the identified position on the core line CL and regenerates a CPR image IC' by the identified curved surface. While the aforementioned operation is continued by the user, display control unit 35 updates the display to the orthogonal cross-section image IS' and CPR image IC' and further superimposes an auxiliary line L-$S_2$' representing the orthogonal cross-section position corresponding to the point of interest POI in the CPR image IC', an auxiliary line L-$S_1$' representing the orthogonal cross-section position corresponding to the point of interest POI and an auxiliary line L-$CPR_1$' representing the curved surface of the CPR image IC' in the characteristic map image IM, and an auxiliary line L-$CPR_2$' representing the curved surface of the CPR image IC' in the orthogonal cross-section image IS'. When the aforementioned operation is terminated by the user, display control unit 35 restores the display to the original state shown in FIG. 17.

As described above, in cooperation with the specification of a point of interest POI in the characteristic map image IM, the orthogonal cross-section image and CPR image corresponding to the point of interest POI may be displayed in the present embodiment, so that the operability is improved. Further, the user is allowed to select the positional relationship between the map imaging range and orthogonal cross-section so that the characteristic map image IM, CPR image IC, and orthogonal cross-section image IS may be displayed cooperatively according to the preference of the user.

In the embodiment described above, the CPR image IC' and orthogonal cross-section image IS' corresponding to the point of interest are displayed only while a specific operating state is continued, but these images may be displayed in a separate screen (window) in response to a completed operation, such as a mouse clicking operation.

Figure 21A:
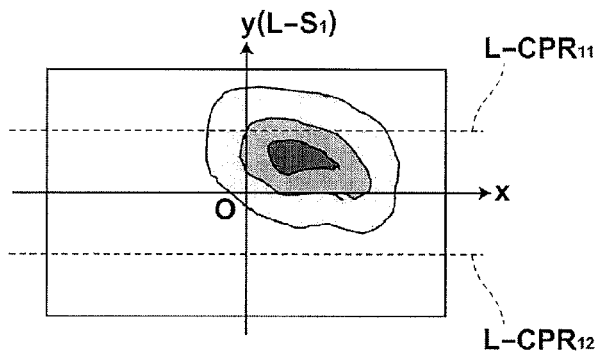
FIG. 21A illustrates a characteristic map image represented by a rectangular coordinate system in the sixth embodiment of the present invention.
Figure 21B:
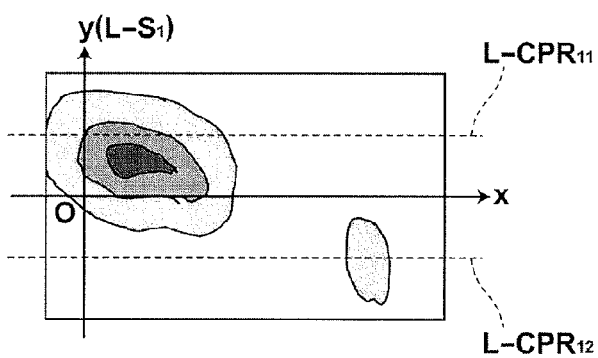
FIG. 21B illustrates a display example in which a characteristic map in front of an orthogonal cross-section is primarily displayed in a characteristic map image represented by a rectangular coordinate system.
Figure 21C:
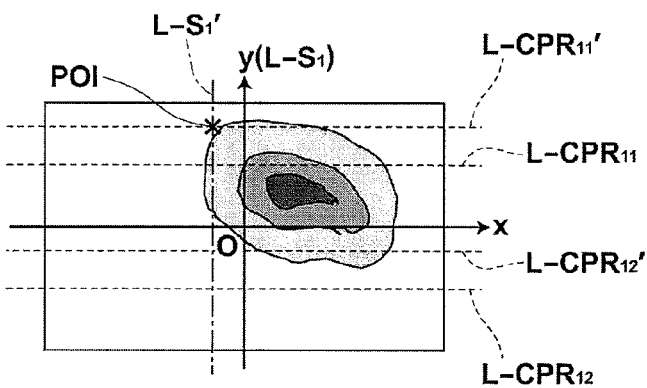
FIG. 21C schematically illustrates updating of a characteristic map image represented by a rectangular coordinate system due to specification of an attention point.

In the embodiment described above, a characteristic map image IM of polar coordinate system is generated, but the same can be achieved by a characteristic map image IM of rectangular coordinate system. FIG. 21A illustrates a display example of characteristic map image IM of rectangular coordinate system in the initial state of FIG. 17. As illustrated in FIG. 21A, the position of y axis representing the direction of the radial visual line $VL_n$ corresponds to the orthogonal cross-section position L-$S_1$ in the present embodiment. Further, the curved surface of the CPR image IC is represented by two auxiliary lines L-$CPR_{11}$ and L-$CPR_{12}$. In this case, if the map condition MC is changed to "PRIORITY DISPLAY OF CHARACTERISTIC MAP IN FRONT SIDE OF CROSS-SECTION" through the user interface of FIG. 18, y axis itself is moved to the left and the index value $IDX_{m,n}$ in the front side (right side in the CPR image IC) of the orthogonal cross-section position L-$S_1$ represented as y axis is imaged in a prioritized manner, as illustrated in FIG. 21B. In the case where a point of interest POI is specified in the characteristic map image IM of rectangular coordinate system, a cooperative display identical to that of the embodiment described above may be possible, as illustrated in FIG. 21C. In this case, y axis itself representing the original position of the orthogonal cross-section is not moved, and the auxiliary line L-$S_1$' representing the position of the orthogonal cross-section corresponding to the point of interest POI and auxiliary lines L-$CPR_{11}$, L-$CPR_{12}$ representing the curved surface of the CPR image corresponding to the point of interest POI are further displayed in a superimposed manner.

Note that the aforementioned embodiment may further include cross-section position change receiving unit 37 identical to that of the fourth embodiment to allow the map imaging range RM and orthogonal cross-section position to be changed independently.

It should be appreciated that each of the embodiments described above is illustrative purposes only and should not be used as limiting the technical scope of the present invention. Further, it should be appreciated that various changes and modifications made in the system configuration, hardware configuration, processing flow, module configuration, user interface, specific processing content, and the like of the embodiment described above without departing from the spirit of the present invention are also included in the technical scope of the present invention.

For example, an embodiment of the present invention may be a combination of distinctive configurations of the respect embodiments described above. A specific example may be an embodiment in which a characteristic map image representing two types of index values is generated and displayed, as in the third embodiment, in the fourth, fifth, or sixth embodiment.

Further, in each of the embodiments described above, an arrangement may be adopted in which a volume of plaque with respect to each type or an average stenosis rate is calculated by index value calculation unit 33 for the entire coronary artery within the imaging range in the characteristic map image IM and the calculated volume of plaque or average stenosis rate is displayed on the display monitor of image processing workstation 3 with the characteristic map image IM.

Further, map image generation unit 34 may be adapted to generate, in advance, a global characteristic map image representing a characteristic of the coronary artery CA in an area wider than the display range in the direction of the core line CL and generates the characteristic map image IM by cutting out the imaging range given in advance or specified by the user from the global characteristic map image.

Further, in the embodiment described above, imaging range change receiving unit 39 changes the map imaging range according to the user operation, but imaging range change receiving unit 39 may be adapted to automatically and sequentially change the map imaging range.

Figure 22A:
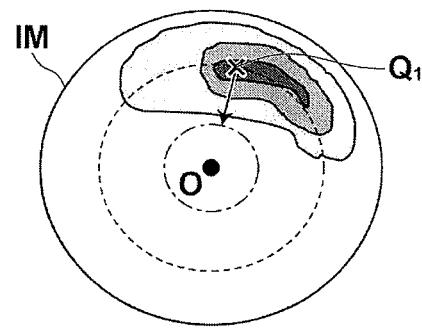
FIG. 22A schematically illustrates an operation for changing the map imaging range in a characteristic map image represented by a polar coordinate system.

Further, the operation for changing the map imaging range may be received in the characteristic map image IM. FIG. 22A schematically illustrates a specific example of such operation. As illustrated in FIG. 22A, an arbitrary position $Q_1$ in the characteristic map image IM may be specified by the user and an operation for moving the specified position $Q_1$ (e.g., mouse drag operation) in a radial direction (arrow direction in FIG. 22A) may be detected. In the case where such operation is detected, the position on the core line CL (radius of the dashed circle) corresponding to the specified position $Q_1$ may be identified, then the position on the core line CL after the specified position is moved (radius of the chain circle) may be identified, and the imaging range RM in the direction of the core line CL after change may be identified based on the moving direction (direction toward the origin O) and the amount of movement (difference in radius before and after the movement). In the example of FIG. 22A, an operation for shifting the imaging range in the direction from the point $P_0$ to point $P_M$ on the core line CL in FIG. 4 by the length of the arrow shown in FIG. 22A is performed and the characteristic map image IM regenerated based on the changed imaging range is an image to which a characteristic of the coronary artery CA beyond the point $P_M$ in FIG. 4 is mapped. In the case where an operation for moving the point $Q_1$ in the direction away from the origin O is detected, an operation for shifting the imaging range in the direction from the point $P_M$ to point $P_0$ on the core line CL in FIG. 4 is performed and the characteristic map image IM regenerated based on the changed imaging range is an image to which a characteristic of the coronary artery CA preceding the point $P_0$ in FIG. 4 is mapped.

Figure 22B:
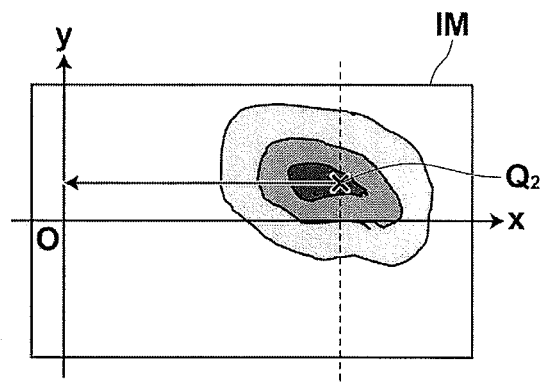
FIG. 22B schematically illustrates an operation for changing the map imaging range in a characteristic map image represented by a rectangular coordinate system.

FIG. 22B schematically illustrates a specific example of operation for changing the imaging range in a characteristic map image IM of rectangular coordinate system. As illustrated in FIG. 22B, in the case where an arbitrary position $Q_2$ in the characteristic map image IM is specified and an operation for moving the specified position $Q_2$ (e.g., mouse drag operation) in an x axis direction (arrow direction in FIG. 22B) is detected, x coordinates of the specified position $Q_2$ before and after the movement are identified, and the imaging range RM in the direction of the core line CL after change may be identified based on the moving direction (direction toward the origin O) and the amount of movement (difference in x coordinate value before and after the movement). In the example of FIG. 22B, an operation for shifting the imaging range in the direction from the point $P_0$ to point $P_M$ on the core line CL in FIG. 4 by the length of the arrow shown in FIG. 22B is performed. The characteristic map image IM regenerated according to this operation is an image to which a characteristic of the coronary artery CA beyond the point $P_M$ in FIG. 4 is mapped. In the case where an operation for moving the point $Q_2$ in the direction away from the origin O is detected, an operation for shifting the imaging range in the direction from the point $P_M$ to point $P_0$ on the core line CL in FIG. 4 is performed and the characteristic map image IM regenerated based on the changed imaging range is an image to which a characteristic of the coronary artery CA preceding the point $P_0$ in FIG. 4 is mapped.

In each of the embodiments described above, a coronary artery of a human body is described as the target of observation, but the present invention is also applied to the case in which the other tubular structure, such as the other blood vessel, trachea, bronchus, or the like, is the target of observation.

What is claimed is:

1. A medical image processing apparatus, comprising:
    a tubular structure extraction unit for extracting a tubular structure from a three-dimensional medical image representing the tubular structure;
    a core line extraction unit for extracting a core line of the extracted tubular structure;
    an index value calculation unit for calculating an index value representing a characteristic of the tubular structure in each direction of radial visual lines orthogonal to the extracted core line at each of a plurality of points on the core line with each point as each viewpoint; and
    a characteristic map image generation unit for generating a characteristic map image representing the characteristic inside of the tubular structure by mapping the index value calculated in each direction of the radial visual lines at each point on the core line to a coordinate plane defined by a first coordinate component representing a position in a direction of the core line and a second coordinate component representing a direction of each visual line.

2. The medical image processing apparatus of claim 1, wherein:
    the index value calculation unit is a unit that calculates two types of index values; and
    the characteristic map image generation unit is a unit that generates a characteristic map image in which either one of the two types of index values is represented in a coordinate space defined by the first and second coordinate components, and a third coordinate component representing the either one of the two types of index values as a coordinate value of the third coordinate component, while the other of the two types of index values is represented by at least one of color, density, and pattern.

3. The medical image processing apparatus of claim 1, wherein the coordinate plane is a plane represented by a polar coordinate system based on the first coordinate component and the second coordinate component.

4. The medical image processing apparatus of claim 3, further comprising:
    a second cross-section image generation unit for generating, from the three-dimensional medical image, a second cross-section image of a cross-section that passes through a given reference point on the core line and orthogonal to the core line at the reference point such that a direction of a predetermined straight line in the cross-section passing through an intersection point of the cross-section and the core line within the cross-section image corresponds to a direction of a straight line in the characteristic map image corresponding to the predetermined straight line; and
    a second display control unit for causing the characteristic map image and the second cross-section image to be displayed on a display unit.

5. The medical image processing apparatus of claim 4, wherein:
    the apparatus further comprises a unit for rotating the characteristic map image by a given angle centered on a point representing the core line in the image;
    the second cross-section image generation unit is a unit that regenerates the already generated second cross-section image so as to be rotated by the given angle; and
    the second display control unit is a unit that causes the current display to be updated to the display of the rotated characteristic map image and second cross-section image.

6. The medical image processing apparatus of claim 4, wherein:
    the apparatus further comprises a unit for rotating the second cross-section image by a given angle centered on a point representing the core line in the image;
    the characteristic map image generation unit is a unit that regenerates the already generated characteristic map image so as to be rotated by the given angle; and
    the second display control unit is a unit that causes the current display to be updated to the display of the rotated characteristic map image and second cross-section image.

7. The medical image processing apparatus of claim 1, wherein the coordinate plane is a plane represented by a rectangular coordinate system defined by the first coordinate component and the second coordinate component.

8. The medical image processing apparatus of claim 1, further comprising:
- a first cross-section image generation unit for generating, from the three-dimensional medical image, a first cross-section image of a cross-section that passes through a given reference point on the core line and orthogonal to the core line at the reference point; and
- a first display control unit for causing the characteristic map image and the first cross-section image to be displayed on a display unit in a manner that allows a position in the characteristic map image corresponding to the reference point of the first cross-section image to be identified.

9. The medical image processing apparatus of claim 8, wherein:
- the apparatus further comprises a reference point changing unit for changing a position of the reference point;
- the first cross-section image generation unit is a unit that regenerates the first cross-section image based on the changed reference point; and
- the first display control unit is a unit that causes the display of the characteristic map image and the cross-section image to be updated based on the position of the changed reference point and the regenerated first cross-section image.

10. The medical image processing apparatus of claim 1, further comprising:
- a unit for generating, from the three-dimensional medical image, a longitudinal direction image of the tubular structure within a predetermined range in a direction of the core line; and
- a third display control unit for causing the characteristic map image and the longitudinal direction image to be displayed on a display unit in a manner that allows a map imaging range which is a range of the tubular structure in the core line direction represented in the characteristic map image to be identified in the longitudinal direction image.

11. The medical image processing apparatus of claim 10, wherein:
- the apparatus further comprises a first imaging range changing unit for changing the map imaging range in the longitudinal direction image;
- the characteristic image generation unit is a unit that regenerates the characteristic map image based on the changed map imaging range; and
- the third display control unit is a unit that causes the display of the characteristic map image and the longitudinal direction image to be updated based on the changed map imaging range and the regenerated characteristic map image.

12. The medical image processing apparatus of claim 1, further comprising:
- a unit for generating, from the three-dimensional medical image, an image of the tubular structure in a longitudinal direction within a predetermined range in a direction of the core line; and
- a fourth display control unit for causing the characteristic map image and the longitudinal direction image to be displayed on a display unit in a manner that allows a longitudinal direction imaging range which is a range of the tubular structure in the core line direction represented in the longitudinal direction image to be identified in the characteristic map image.

13. The medical image processing apparatus of claim 12, wherein:
- the apparatus further comprises a second imaging range changing unit for changing the longitudinal direction imaging range in the characteristic map image;
- the unit for generating the longitudinal direction image is a unit that regenerates the longitudinal direction image based on the changed longitudinal direction imaging range; and
- the fourth display control unit is a unit that causes the display of the characteristic map image and the longitudinal direction image to be updated based on the changed longitudinal direction imaging range and the regenerated longitudinal direction image.

14. The medical image processing apparatus of claim 1, wherein the index value calculation unit is a unit that further calculates an index value representing a characteristic of the tubular structure over the entire target region for generating the characteristic map image.

15. The medical image processing apparatus of claim 1, wherein the tubular structure is a blood vessel.

16. The medical image processing apparatus of claim 15, wherein the tubular structure is a coronary artery.

17. The medical image processing apparatus of claim 15, wherein the index value is a value representing a characteristic of a plaque.

18. The medical image processing apparatus of claim 1, wherein the index value is a stenosis rate of the tubular structure.

19. A computer-implemented medical image processing method, comprising the steps of:
- extracting a tubular structure from a three-dimensional medical image representing the tubular structure;
- extracting a core line of the extracted tubular structure;
- calculating an index value representing a characteristic of the tubular structure in each direction of radial visual lines orthogonal to the core line at each of a plurality of points on the extracted core line with each point as each viewpoint; and
- generating a characteristic map image representing the characteristic inside of the tubular structure by mapping the index value calculated in each direction of the radial visual lines at each point on the core line to a coordinate plane defined by a first coordinate component representing a position in a direction of the core line and a second coordinate component representing a direction of each visual line.

20. A non-transitory computer readable recording medium on which is recorded a medical image processing program for causing a computer to function as:
- a tubular structure extraction unit for extracting a tubular structure from a three-dimensional medical image representing the tubular structure;
- a core line extraction unit for extracting a core line of the extracted tubular structure;
- an index value calculation unit for calculating an index value representing a characteristic of the tubular structure in each direction of radial visual lines orthogonal to the core line at each of a plurality of points on the extracted core line with each point as each viewpoint; and
- a characteristic map image generation unit for generating a characteristic map image representing the characteristic inside of the tubular structure by mapping the index value calculated in each direction of the radial visual lines at each point on the core line to a coordinate plane defined by a first coordinate component representing a position in a direction of the core line and a second coordinate component representing a direction of each visual line.

* * * * *